(12) United States Patent
Wang et al.

(10) Patent No.: US 12,299,813 B2
(45) Date of Patent: May 13, 2025

(54) SYSTEMS AND METHODS FOR GENERATING THREE-DIMENSIONAL IMAGES

(71) Applicant: SHANGHAI UNITED IMAGING HEALTHCARE CO., LTD., Shanghai (CN)

(72) Inventors: Xu Wang, Shanghai (CN); Yuxiang Huang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 148 days.

(21) Appl. No.: 18/050,036

(22) Filed: Oct. 26, 2022

(65) Prior Publication Data

US 2023/0060131 A1 Mar. 2, 2023

Related U.S. Application Data

(63) Continuation of application No. PCT/CN2020/140288, filed on Dec. 28, 2020.

(30) Foreign Application Priority Data

Apr. 26, 2020 (CN) .......................... 202010339046.1

(51) Int. Cl.
*G06T 17/00* (2006.01)
*G06N 20/00* (2019.01)
(52) U.S. Cl.
CPC .......... *G06T 17/00* (2013.01); *G06T 2210/41* (2013.01)
(58) Field of Classification Search
CPC ........... G06T 17/00; G06T 2207/20081; G06T 2207/20084; G06N 20/00
See application file for complete search history.

(56) References Cited

U.S. PATENT DOCUMENTS 6,301,496 B1 10/2001 Reisfeld
9,968,257 B1 * 5/2018 Burt ..................... A61B 5/0035
(Continued)

FOREIGN PATENT DOCUMENTS

CN 105374023 A 3/2016
CN 106504253 A 3/2017
(Continued)

OTHER PUBLICATIONS

Shen et al. ("Patient-specific reconstruction of volumetric computed tomography images from a single projection view via deep learning", 2019 (Year: 2019).*

(Continued)

*Primary Examiner* — Phong X Nguyen
(74) *Attorney, Agent, or Firm* — METIS IP LLC

(57) ABSTRACT

The present disclosure relates to systems and methods for generating a three-dimensional (3D) image. The method may include obtaining a target two-dimensional (2D) image of a subject; obtaining a 3D image generation model that includes a plurality of sequentially connected layers, at least one layer of which may include a down-sampling block, a connection block, and an up-sampling block; and determining a target 3D image of the subject by processing the target 2D image using the 3D image generation model. The down-sampling block may be configured to generate a plurality of 2D feature maps by coding an input of the down-sampling block. The connection block may be configured to generate at least one 3D feature map based on the plurality of 2D feature maps. The up-sampling block may be configured to generate at least one target 3D feature map by processing the at least one 3D feature map.

19 Claims, 13 Drawing Sheets

(56) References Cited

U.S. PATENT DOCUMENTS

| | | | |
|---|---|---|---|
| 11,263,756 B2* | 3/2022 | Chidlovskii | G06N 20/20 |
| 2016/0163101 A1 | 6/2016 | Jang et al. | |
| 2017/0091934 A1* | 3/2017 | Waechter-Stehle | G06T 7/0012 |
| 2019/0004534 A1 | 1/2019 | Huang et al. | |
| 2019/0030371 A1* | 1/2019 | Han | A61N 5/1039 |
| 2019/0066265 A1 | 2/2019 | Lin et al. | |
| 2019/0139216 A1* | 5/2019 | Georgescu | G06N 3/048 |
| 2019/0188541 A1* | 6/2019 | Wang | G01S 7/4802 |
| 2019/0261945 A1* | 8/2019 | Funka-Lea | A61B 8/0883 |
| 2020/0004514 A1* | 1/2020 | Yu | G06N 3/08 |
| 2020/0193603 A1* | 6/2020 | Golden | G06T 7/149 |
| 2021/0038198 A1* | 2/2021 | Jacob | G06F 18/2135 |
| 2021/0049397 A1* | 2/2021 | Chen | G06V 10/82 |
| 2021/0073982 A1* | 3/2021 | Xia | G16H 30/20 |
| 2021/0097258 A1* | 4/2021 | Mohan | G06N 3/045 |
| 2021/0192810 A1* | 6/2021 | Paysan | G06T 7/0012 |
| 2021/0256700 A1* | 8/2021 | Senouf | A61B 8/4461 |
| 2021/0304364 A1* | 9/2021 | Kabaria | G06V 30/19173 |
| 2021/0350168 A1* | 11/2021 | Tian | G06T 3/40 |
| 2021/0401392 A1* | 12/2021 | Bengtsson | G16H 50/20 |
| 2022/0028154 A1* | 1/2022 | Lee | G06T 15/005 |
| 2022/0147791 A1* | 5/2022 | Yao | G06N 3/0495 |
| 2022/0319155 A1* | 10/2022 | Lu | G06V 10/82 |
| 2023/0060131 A1* | 3/2023 | Wang | G06N 3/045 |
| 2024/0029345 A1* | 1/2024 | Selvert | G06T 7/40 |
| 2024/0144584 A1* | 5/2024 | Son | G06N 3/00 |

FOREIGN PATENT DOCUMENTS

| | | | |
|---|---|---|---|
| CN | 109492755 A | 3/2019 | |
| CN | 109584164 A | 4/2019 | |
| CN | 109815964 A | 5/2019 | |
| CN | 109816037 A | 5/2019 | |
| CN | 110338830 A | 10/2019 | |
| CN | 110660123 A | 1/2020 | |

OTHER PUBLICATIONS

International Search Report in PCT/CN2020/140288 mailed on Mar. 26, 2021, 4 pages.

Written Opinion in PCT/CN2020/140288 mailed on Mar. 26, 2021, 4 pages.

Phlipp Henzler et al., Single-image Tomography: 3D Volumes from 2D Cranial X-Rays, Computer Graphics Forum, 37(2): 377-388, 2018.

Ying, Xingde et al., X2CT-GAN: Reconstructing CT from Biplanar X-Rays with Generative Adversarial Networks, 2019 IEEE/CVF conference on computer vision and pattern recognition, 10619-10628, 2019.

First Office Action in Chinese Application No. 202010339046.1 mailed on Aug. 3, 2022, 21 pages.

Shen, Liyue et al., Patient-specific Reconstruction of Volumetric Computed Tomography Images from a Single Projection View via Deep Learning, Nature Biomedical Engineering, 3(11): 880-888, 2019.

Kuang, Hailan et al., 3D Face Reconstruction With Texture Details From a Single Image Based on Gan, 2019 11th International Conference on Measuring Technology and Mechatronics Automation, 385-388, 2019.

V. V. Kniaz et al., Generative Adversarial Networks for Single Photo 3D Reconstruction, The international Archives of the Photogrammetry, Remote Sensing and Spatial Information Sciences, 403-408, 2019.

* cited by examiner

1110

1120

1130

1210 1211

1220

1230

SYSTEMS AND METHODS FOR GENERATING THREE-DIMENSIONAL IMAGES

CROSS-REFERENCE TO RELATED APPLICATIONS

This application is a Continuation of International Application No. PCT/CN2020/140288, filed on Dec. 28, 2020, which claims priority to Chinese Patent Application No. 202010339046.1, filed on Apr. 26, 2020, and the contents of which are hereby incorporated by reference.

TECHNICAL FIELD

The present disclosure generally relates to image processing, and in particular, to systems and methods for generating a three-dimensional (3D) image.

BACKGROUND

Medical imaging techniques, such as a magnetic resonance imaging (MRI) technique, a computed tomography (CT) imaging technique, or the like, have been widely used for disease diagnosis and/or treatment. A 3D image that can reflect the shape and/or posture of a subject in a 3D space often needs to be acquired or generated.

SUMMARY

According to an aspect of the present disclosure, a method for generating a 3D image implemented on a computing device having at least one processor and at least one storage device is provided. The method may include obtaining a target two-dimensional (2D) image of a subject. The method may include obtaining a 3D image generation model. The 3D image generation model may include a plurality of sequentially connected layers. At least one layer of the plurality of layers may include a down-sampling block, a connection block, and an up-sampling block. The method may include determining a target 3D image of the subject by processing the target 2D image using the 3D image generation model. During the processing of the target 2D image, the down-sampling block may be configured to generate a plurality of 2D feature maps by coding an input of the down-sampling block. The input of the down-sampling block may include an output generated by a previous layer of the at least one layer based on the target 2D image. The connection block may be configured to generate at least one 3D feature map based on the plurality of 2D feature maps. The up-sampling block may be configured to generate at least one target 3D feature map associated with the target 3D image by processing the at least one 3D feature map.

In some embodiments, the target 2D image may include a scout image of the subject.

In some embodiments, the scout image of the subject may include an anteroposterior scout image of the subject or a lateral scout image of the subject.

In some embodiments, the obtaining the 3D image generation model may further include determining a posture of the subject based on the target 2D image of the subject; selecting a candidate 3D image generation model corresponding to the posture of the subject from a model library that includes a plurality of candidate 3D image generation models corresponding to a plurality of postures of the subject; and designating the selected candidate 3D image generation model as the 3D image generation model.

In some embodiments, to generate the at least one 3D feature map based on the plurality of 2D feature maps, the connection block may be further configured to divide the plurality of 2D feature maps into at least one group, each of the at least one group including at least two of the plurality of 2D feature maps; combining the at least two 2D feature maps in the group into a combined 3D feature map for each of the at least one group; and generating the at least one 3D feature map based on the at least one combined 3D feature map of the at least one group.

In some embodiments, the generating the at least one 3D feature map based on the at least one combined 3D feature map of the at least one group may include generating a processed 3D feature map by performing a 3D convolution operation on the combined 3D feature map for each of the at least one combined 3D feature map; and designating the at least one processed 3D feature map as the at least one 3D feature map.

In some embodiments, the 3D image generation model may be generated according to a model training process including obtaining a preliminary model; obtaining a plurality of training samples each of which may include a sample 2D image of a sample subject and a sample 3D image of the sample subject; and generating the 3D image generation model by training the preliminary model using the plurality of training samples.

In some embodiments, the preliminary model may be a preliminary generative adversarial network (GAN) model including a preliminary generator and a preliminary discriminator. The generating the 3D image generation model may include generating a trained model by training the preliminary model using the plurality of training samples, the trained model including a trained generator trained from the preliminary generator and a trained discriminator trained from the preliminary discriminator; and designating the trained generator as the 3D image generation model.

In some embodiments, for each of the plurality of training samples, the obtaining the plurality of training samples may include obtaining a preliminary sample 2D image of the sample subject of the training sample; determining a 2D coordinate of a point of interest (POI) relating to an ROI of the sample subject based on the preliminary sample 2D image; segmenting a first region corresponding to the ROI of the sample subject based on the 2D coordinate of the POI from the preliminary sample 2D image; and generating the sample 2D image of the sample subject based on the first region.

In some embodiments, for each of the plurality of training samples, the obtaining of the plurality of training samples further includes obtaining a preliminary sample 3D image of the sample subject of the training sample; determining a 3D coordinate of the POI based on the 2D coordinate of the POI; segmenting a second region corresponding to the ROI of the sample subject from the preliminary sample 3D image and based on the 3D coordinate of the POI; and generating the sample 3D image of the sample subject based on the second region.

According to another aspect of the present disclosure, a system for generating a 3D image is provided. The system may include at least one storage device including a set of instructions and at least one processor configured to communicate with the at least one storage device. When executing the set of instructions, the at least one processor may be configured to direct the system to perform operations including obtaining a target 2D image of a subject; obtaining a 3D image generation model that may include a plurality of sequentially connected layers, and at least one layer of the plurality of layers may include a down-sampling block, a connection block, and an up-sampling block; and determining a target 3D image of the subject by processing the target 2D image using the 3D image generation model. During the processing of the target 2D image, the down-sampling block may be configured to generate a plurality of 2D feature maps by coding an input of the down-sampling block, the input of the down-sampling block including an output generated by a previous layer of the at least one layer based on the target 2D image. The connection block may be configured to generate at least one 3D feature map based on the plurality of 2D feature maps. The up-sampling block may be configured to generate at least one target 3D feature map associated with the target 3D image by processing the at least one 3D feature map.

According to yet another aspect of the present disclosure, a non-transitory computer readable medium including a set of instructions for generating a 3D image is provided. When executed by at least one processor, the set of instructions may direct the at least one processor to effectuate a method, the method comprising: obtaining a target 2D image of a subject; obtaining a 3D image generation model that may include a plurality of sequentially connected layers, at least one layer of the plurality of layers may include a down-sampling block, a connection block, and an up-sampling block; and determining a target 3D image of the subject by processing the target 2D image using the 3D image generation model. During the processing of the target 2D image, the down-sampling block may be configured to generate a plurality of 2D feature maps by coding an input of the down-sampling block, the input of the down-sampling block including an output generated by a previous layer of the at least one layer based on the target 2D image. The connection block may be configured to generate, based on the plurality of 2D feature maps, at least one 3D feature map. The up-sampling block may be configured to generate at least one target 3D feature map associated with the target 3D image by processing the at least one 3D feature map.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections, or assembly of different levels in ascending order.

However, the terms may be displaced by another expression if they achieve the same purpose.

Figure 2:
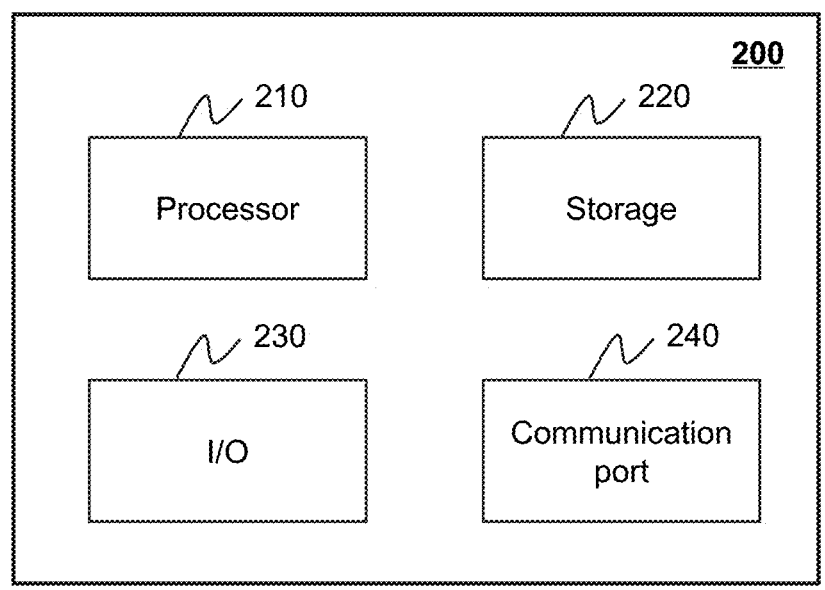
FIG. 2 is a schematic diagram illustrating hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., a processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "image" in the present disclosure is used to collectively refer to image data (e.g., scan data, projection data) and/or images of various forms, including a two-dimensional (2D) image, a three-dimensional (3D) image, a four-dimensional (4D), etc. The term "pixel" and "voxel" in the present disclosure are used interchangeably to refer to an element of an image.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and methods for non-invasive biomedical imaging, such as for disease diagnostic or research purposes. In some embodiments, the systems may include a single modality imaging system and/or a multi-modality imaging system. The single modality imaging system may include, for example, an ultrasound imaging system, an X-ray imaging system, an computed tomography (CT) system, a magnetic resonance imaging (MRI) system, an ultrasonography system, a positron emission tomography (PET) system, an optical coherence tomography (OCT) imaging system, an ultrasound (US) imaging system, an intravascular ultrasound (IVUS) imaging system, a near infrared spectroscopy (NIRS) imaging system, or the like, or any combination thereof. The multi-modality imaging system may include, for example, an X-ray imaging-magnetic resonance imaging (X-ray-MRI) system, a positron emission tomography-X-ray imaging (PET-X-ray) system, a single photon emission computed tomography-magnetic resonance imaging (SPECT-MRI) system, a positron emission tomography-computed tomography (PET-CT) system, a C-arm system, a digital subtraction angiography-magnetic resonance imaging (DSA-MRI) system, etc. It should be noted that the imaging system described below is merely provided for illustration purposes, and not intended to limit the scope of the present disclosure.

The term "imaging modality" or "modality" as used herein broadly refers to an imaging method or technology that gathers, generates, processes, and/or analyzes imaging information of a subject. The subject may include a biological subject and/or a non-biological subject. The biological subject may be a human being, an animal, a plant, or a portion thereof (e.g., a cell, a tissue, an organ, etc.). In some embodiments, the subject may be a man-made composition of organic and/or inorganic matters that are with or without life.

Moreover, while the systems and methods disclosed in the present disclosure are described primarily regarding generating a 3D image in a medical imaging system. It should be understood that this is only one exemplary embodiment. The systems and methods of the present disclosure may be applied to any other kind of systems. For example, the systems and methods of the present disclosure may be applied to generate 3D images acquired in different scenarios and/or for different purposes (e.g., safety monitoring, filming, or photography) and/or by different image acquisition devices (e.g., a digital camera, an analog camera, or a scanner).

On some occasions, a two-dimensional (2D) image of a subject may be acquired, and a 3D image of the subject may need to be generated based on the 2D image. For example, a 2D scout image of the subject may be acquired by performing a 2D CT scan on the subject, and a 3D CT image may be generated based on the 2D scout image. The 3D CT image may reflect the shape and/or posture of the subject (or a portion thereof) in a 3D space and be used in radiation dose planning for a subsequent 3D CT scan. Therefore, it may be desirable to provide systems and methods for generating a 3D image based on a 2D image.

Recently, machine learning models have been used in transforming 2D images into 3D images. However, conventionally machine learning models may have a limited accuracy and/or efficiency. For example, a 2D U-Net network has been proposed to generate a 3D image based on a 2D image, but the 3D image generated by the 2D U-network is blurry and has a lot of strip artifacts. Another proposed U-net model may receive multiple 2D images of the subject, process each 2D image separately, and generate the 3D image, which needs a lot of computational resources (e.g., time and/or storage space) and has a limited efficiency.

An aspect of the present disclosure relates to systems and methods for generating a 3D image. The systems and methods may obtain a target 2D image of a subject and a 3D image generation model. The systems and methods may further determine a target 3D image of the subject by processing the target 2D image using the 3D image generation model.

In some embodiments, the 3D image generation model may have a specially designed configuration so that it is capable of generating the target 3D image based on a single target 2D image. For example, the 3D image generation model may include a plurality of sequentially connected layers. At least one layer of the plurality of layers may include a down-sampling block, a connection block, and an up-sampling block. During the processing of the target 2D image, the down-sampling block may be configured to generate a plurality of 2D feature maps by coding an input of the down-sampling block, and the input of the down-sampling block may include an output generated by a previous layer of the at least one layer based on the target 2D image. The connection block may be configured to generate at least one 3D feature map based on the plurality of 2D feature maps. The up-sampling block may be configured to generate at least one target 3D feature map associated with the target 3D image by processing the at least one 3D feature map. Compared with the conventional approach, the systems and methods disclosed herein may obviate the need of acquiring multiple 2D images of the subject, which may improve the efficiency of 3D image generation by, for example, reducing the scanning time, the processing time, the computational complexity and/or cost.

Figure 1:
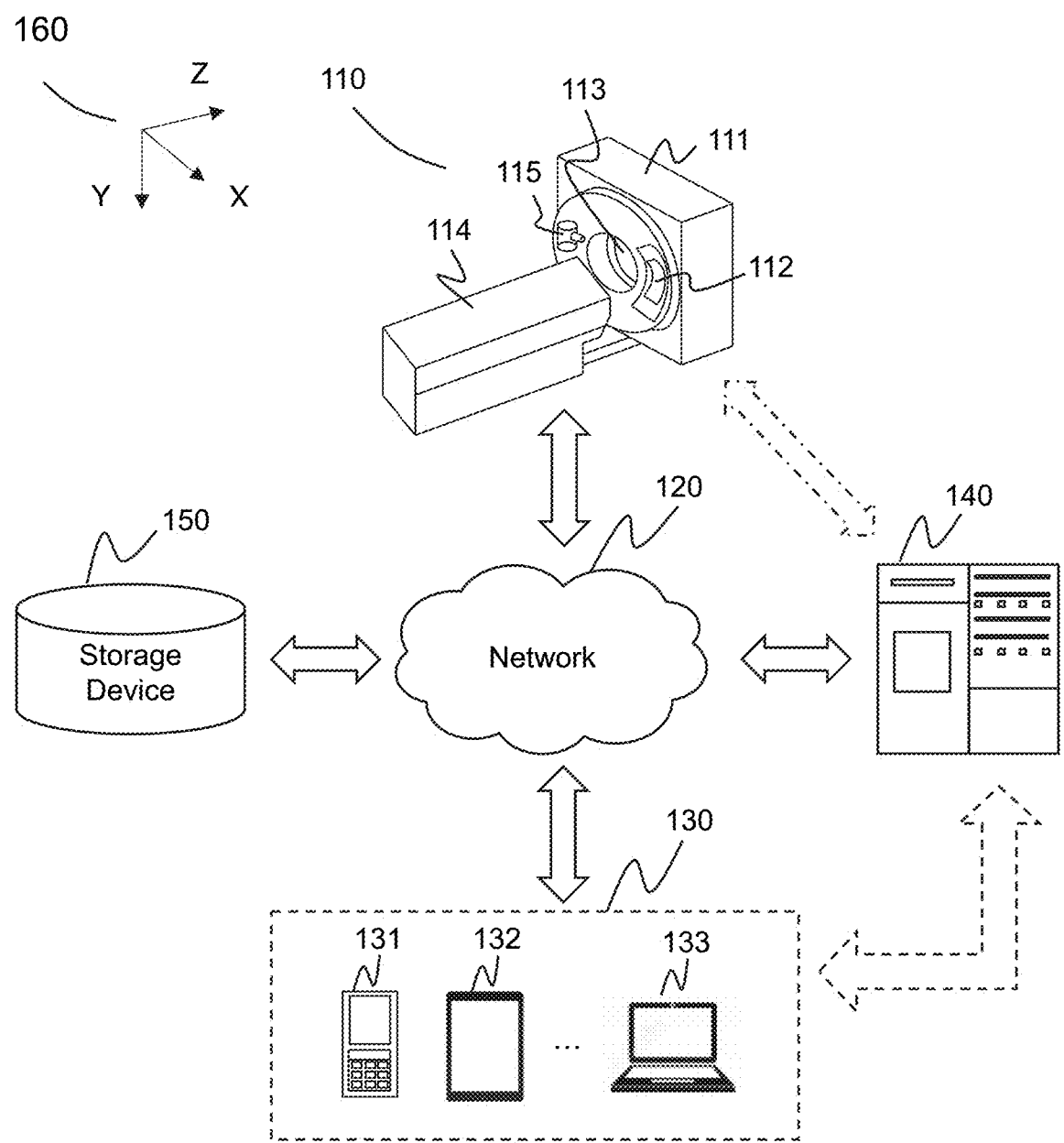
FIG. 1 is a schematic diagram illustrating an exemplary imaging system according to some embodiments of the present disclosure.

FIG. 1 is a schematic diagram illustrating an exemplary imaging system 100 according to some embodiments of the present disclosure.

As illustrated in FIG. 1, the imaging system 100 may include an imaging device 110, a network 120, one or more terminals 130, a processing device 140, and a storage device 150. The components in the imaging system 100 may be connected in one or more of various ways. Merely by way of example, the imaging device 110 may be connected to the processing device 140 through the network 120. As another example, the imaging device 110 may be connected to the processing device 140 directly as indicated by the bi-directional arrow in dotted lines linking the imaging device 110 and the processing device 140. As a further example, the storage device 150 may be connected to the processing device 140 directly or through the network 120. As still a further example, the terminal 130 may be connected to the processing device 140 directly (as indicated by the bi-directional arrow in dotted lines linking the terminal 130 and the processing device 140) or through the network 120.

The imaging device 110 may generate or provide image data related to a subject via scanning a subject. In some embodiments, the subject may include a biological subject and/or a non-biological subject. For example, the subject may include a specific portion of a body, such as a head, a thorax, an abdomen, or the like, or a combination thereof. In some embodiments, the imaging device 110 may include a single-modality scanner (e.g., a CT scanner) and/or multi-modality scanner (e.g., a PET-CT scanner) as described elsewhere in this disclosure. In some embodiments, the image data relating to the subject may include projection data, one or more 2D images of the subject, one or more 3D images of the subject, etc. The projection data may include raw data generated by the imaging device 110 by scanning the subject and/or data generated by performing a projection on an image of the subject.

In some embodiments, the imaging device 110 may include a gantry 111, a detector 112, a detecting region 113, a scanning table 114, and a radioactive scanning source 115. The gantry 111 may support the detector 112 and the radioactive scanning source 115. The subject may be placed on the scanning table 114 to be scanned. The radioactive scanning source 115 may emit radioactive rays to the subject. The radiation may include a particle ray, a photon ray, or the like, or a combination thereof. In some embodiments, the radiation may include a plurality of radiation particles (e.g., neutrons, protons, electrons, p-mesons, heavy ions), a plurality of radiation photons (e.g., X-ray, a y-ray, ultraviolet, laser), or the like, or a combination thereof. The detector 112 may detect radiations and/or radiation events (e.g., gamma photons) emitted from the detecting region 113. In some embodiments, the detector 112 may include a plurality of detector units. The detector units may include a scintillation detector (e.g., a cesium iodide detector) or a gas detector. The detector unit may be a single-row detector or a multi-rows detector.

The network 120 may facilitate exchange of information and/or data. In some embodiments, one or more components of the imaging system 100 (e.g., the imaging device 110, the terminal 130, the processing device 140, or the storage device 150) may send information and/or data to another component(s) of the imaging system 100 via the network 120. For example, the processing device 140 may obtain, via the network 120, one or more images (e.g., 2D images, 3D images, projection images, etc.) from the storage device 150. As another example, the processing device 140 may obtain a model (e.g., a preliminary model, a trained model, etc.) from the storage device 150. In some embodiments, the network 120 may be any type of wired or wireless network, or combination thereof. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points through which one or more components of the imaging system 100 may be connected to the network 120 to exchange data and/or information.

The terminal 130 may include a mobile device 131, a tablet computer 132, a laptop computer 133, or the like, or any combination thereof. In some embodiments, the mobile device 131 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, an accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a HoloLens™, a Gear VR™, etc. In some embodiments, the terminal 130 may remotely operate the imaging device 110. In some embodiments, the terminal 130 may operate the imaging device 110 via a wireless connection. In some embodiments, the terminal 130 may receive information and/or instructions inputted by a user, and send the received information and/or instructions to the imaging device 110 or the processing device 140 via the network 120. In some embodiments, the terminal 130 may receive data and/or information from the processing device 140. In some embodiments, the terminal 130 may be omitted or be part of the processing device 140.

In some embodiments, the processing device 140 may process data obtained from the imaging device 110, the terminal 130, or the storage device 150. For example, the processing device 140 may obtain or generate a plurality of training samples for training a 3D image generation model. The processing device 140 may further generate the 3D image generation model by training a preliminary model using the training samples. As another example, the processing device 140 may generate a target 3D image of a subject by processing a target 2D image of the subject using the 3D image generation model.

In some embodiments, the training samples and/or the 3D image generation model may be generated by a processing device of a system different from the imaging system 100 or a server different from the processing device 140 on which the application of the 3D image generation model is performed. For instance, the training samples and/or the 3D image generation model may be generated by a first system of a vendor who provides and/or maintains such a 3D image generation model, while the generation of a 3D image based on the provided 3D image generation model may be performed on a second system of a client of the vendor. In some embodiments, the application of the 3D image generation model may be performed online in response to a request for generating a 3D image. In some embodiments, the training samples and/or the 3D image generation model may be determined or generated offline.

In some embodiments, the 3D image generation model may be determined and/or updated (or maintained) by, e.g., the manufacturer of the imaging device 110 or a vendor. For instance, the manufacturer or the vendor may load the 3D image generation model into the imaging system 100 or a portion thereof (e.g., the processing device 140) before or during the installation of the imaging device 110 and/or the processing device 140, and maintain or update the 3D image generation model from time to time (periodically or not). The maintenance or update may be achieved by installing a program stored on a storage device (e.g., a compact disc, a USB drive, etc.) or retrieved from an external source (e.g., a server maintained by the manufacturer or vendor) via the network 120. The program may include a new model (e.g., a new 3D image generation model) or a portion of a model that substitutes or supplements a corresponding portion of the model.

In some embodiments, the processing device 140 may be a single server or a server group. The server group may be centralized or distributed. For example, the processing device 140 may be a central processing unit (CPU), a digital signal processor (DSP), a system on a chip (SoC), a microcontroller unit (MCU), or the like, or any combination thereof. In some embodiments, the processing device 140 may be local or remote. For example, the processing device 140 may access information and/or data stored in the imaging device 110, the terminal 130, and/or the storage device 150 via the network 120. As another example, the processing device 140 may be directly connected to the imaging device 110, the terminal 130, and/or the storage device 150, to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented on a computing device 200 having one or more components illustrated in FIG. 2 in the present disclosure.

The storage device 150 may store data and/or instructions. In some embodiments, the storage device 150 may store data obtained from the terminal 130 and/or the processing device 140. For example, the storage device 150 may store one or more images obtained from the processing device 140 and/or the imaging device 110. As another example, the storage device 150 may store a model (e.g., a preliminary model, a trained model, etc.). In some embodiments, the storage device 150 may store data and/or instructions that the processing device 140 may execute or use to perform exemplary methods described in the present disclosure. For example, the storage device 150 may store data and/or instructions that the processing device 140 may execute or use to generate a 3D image. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the imaging system 100 (e.g., the terminal 130, the processing device 140). One or more components of the imaging system 100 may access the data or instructions stored in the storage device 150 via the network 120. In some embodiments, the storage device 150 may be directly connected to or communicate with one or more components of the imaging system 100 (e.g., the terminal 130, the processing device 140). In some embodiments, the storage device 150 may be part of the processing device 140.

In some embodiments, a coordinate system may be provided for the imaging system 100 to define a position of a component and/or the subject (e.g., an absolute position, a position relative to another component). For illustration purposes, the coordinate system 160 may include the X-axis, the Y-axis, and the Z-axis. The X-axis and the Z-axis shown in FIG. 1 may be horizontal, and the Y-axis may be vertical. As illustrated, a positive X direction along the X-axis may be from the left side to the right side of the scanning table 114 viewed from the direction facing the front of the medical imaging device 110; a positive Z direction along the Z-axis may be the direction in which the scanning table 114 is moved into the detecting region 113 from the outside viewed from the direction facing the front of the medical imaging device 110, and a positive Y direction along the Y-axis may be from the upper part (or from the floor where the imaging system 100 stands) to the lower part of the gantry 111.

It should be noted that the above description of the imaging system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the imaging system 100 may include one or more additional components. Additionally or alternatively, one or more components of the imaging system 100 described above may be omitted. As another example, two or more components of the imaging system 100 may be integrated into a single component.

FIG. 2 is a schematic diagram illustrating hardware and/or software components of an exemplary computing device 200 according to some embodiments of the present disclosure. The computing device 200 may be used to implement any component of the imaging system 100 as described herein. For example, the processing device 140 and/or the terminal 130 may be implemented on the computing device 200, respectively, via its hardware, software program, firmware, or a combination thereof. Although only one such computing device is shown, for convenience, the computer functions relating to the imaging system 100 as described herein may be implemented in a distributed fashion on a number of similar platforms, to distribute the processing load.

As illustrated in FIG. 2, the computing device 200 may include a processor 210, a storage device 220, an input/output (I/O) 230, and a communication port 240. The processor 210 may execute computer instructions (program code) and, when executing the instructions, cause the processing device 140 to perform functions of the processing device 140 in accordance with techniques described herein. The computer instructions may include, for example, routines, programs, objects, components, signals, data structures, procedures, modules, and functions, which perform particular functions described herein.

In some embodiments, the processor 210 may process data and/or images obtained from the imaging device 110, the terminal 130, the storage device 150, and/or any other component of the imaging system 100. For example, the processor 210 may obtain a plurality of training samples from the storage device 150, and generate a 3D image generation model by training a preliminary model using the plurality of training samples. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes process A and a second processor executes process B, or the first and second processors jointly execute operations A and B).

The storage device 220 may store data/information obtained from the imaging device 110, the terminal 130, the storage device 150, or any other component of the imaging system 100. In some embodiments, the storage device 220 may include a mass storage device, a removable storage device, a volatile read-and-write memory, a read-only memory (ROM), or the like, or any combination thereof. In some embodiments, the storage device 220 may store one or more programs and/or instructions to perform exemplary methods described in the present disclosure.

The I/O 230 may input or output signals, data, and/or information. In some embodiments, the I/O 230 may enable user interaction with the processing device 140. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected to a network (e.g., the network 120) to facilitate data communications. The communication port 240 may establish connections between the processing device 140 and the imaging device 110, the terminal 130, or the storage device 150. The connection may be a wired connection, a wireless connection, or a combination of both that enables data transmission and reception. The wired connection may include an electrical cable, an optical cable, a telephone wire, or the like, or any combination thereof. The wireless connection may include Bluetooth, Wi-Fi, WiMAX, WLAN, ZIGBEE, mobile network (e.g., 3G, 4G, 5G, etc.), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
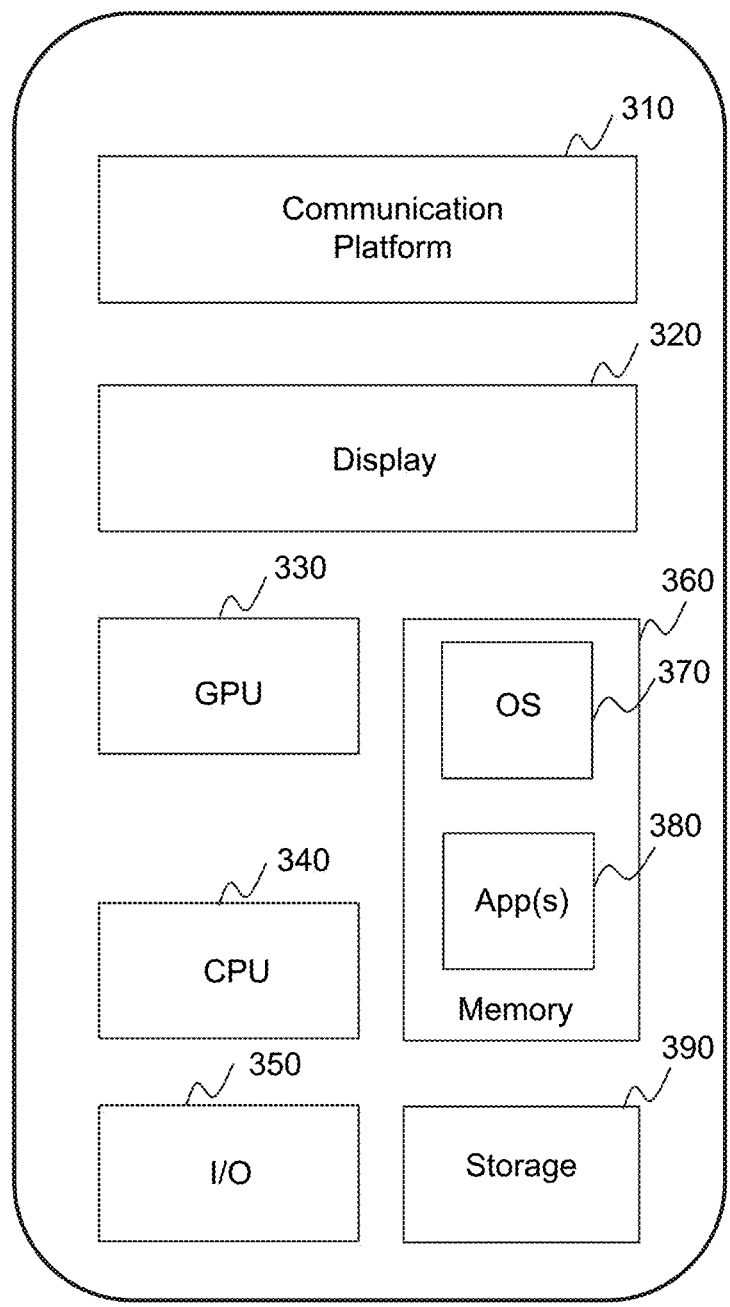
FIG. 3 is a schematic diagram illustrating hardware and/or software components of an exemplary mobile device according to some embodiments of the present disclosure.

FIG. 3 is a schematic diagram illustrating hardware and/or software components of a mobile device 300 according to some embodiments of the present disclosure. In some embodiments, the processing device 140 and/or the terminal 130 may be implemented on the mobile device 300. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to the imaging system 100 from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate a high-quality image of a subject as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4A:
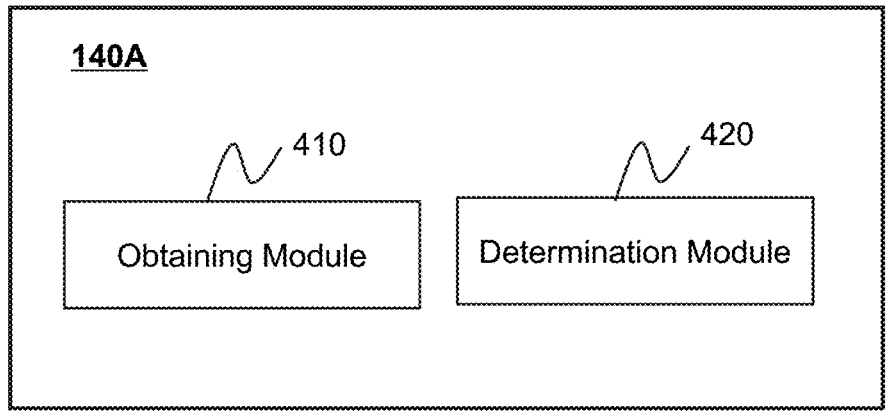
FIGS. 4A and 4B are block diagrams illustrating exemplary processing devices according to some embodiments of the present disclosure.
Figure 4B:
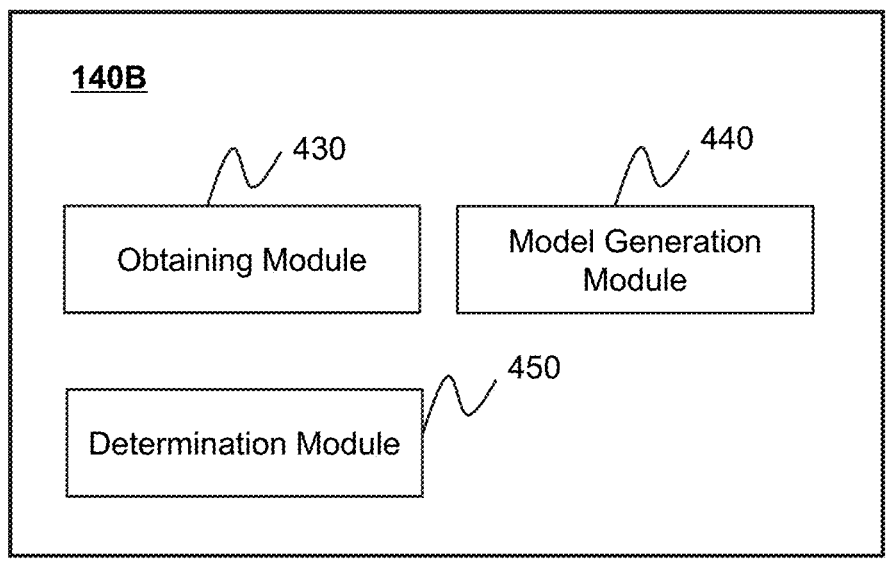

FIGS. 4A and 4B are block diagrams illustrating exemplary processing devices 140A and 140B according to some embodiments of the present disclosure. The processing devices 140A and 140B may be exemplary processing devices 140 as described in connection with FIG. 1. In some embodiments, the processing device 140A may be configured to apply a 3D image generation model in 3D image generation. The processing device 140B may be configured to obtain a plurality of training samples and/or generate the 3D image generation model using the training samples. In some embodiments, the processing devices 140A and 140B may be respectively implemented on a processing unit (e.g., a processor 210 illustrated in FIG. 2 or a CPU 340 as illustrated in FIG. 3). Merely by way of example, the processing devices 140A may be implemented on a CPU 340 of a terminal device, and the processing device 140B may be implemented on a computing device 200. Alternatively, the processing devices 140A and 140B may be implemented on a same computing device 200 or a same CPU 340. For example, the processing devices 140A and 140B may be implemented on a same computing device 200.

As shown in FIG. 4A, the processing device 140A may include an obtaining module 410 and a determination module 420.

The obtaining module 410 may be configured to obtain a target 2D image of a subject. The target 2D image may include a scout image (e.g., an anteroposterior (AP) scout image, a posteroanterior (PA) scout image, a lateral scout image, etc.) of the subject. The obtaining module 410 may also be configured to obtain a 3D image generation model. More descriptions regarding the obtaining module 410 may be found elsewhere in the present disclosure. See, e.g., operations 510 and 520 and the relevant descriptions thereof.

The determination module 420 may be configured to determine a target 3D image of the subject by processing the target 2D image using the 3D image generation model. More descriptions regarding the determination module 420 may be found elsewhere in the present disclosure. See, e.g., operation 530 and the relevant descriptions thereof.

As shown in FIG. 4B, the processing device 140B may include an obtaining module 430, a model generation module 440, and a determination module 450.

The obtaining module 430 may be configured to obtain a preliminary model and a plurality of training samples. Each of the training samples may include a sample 2D image of a sample subject and a sample 3D image of the sample subject. The preliminary model may be any type of model to be trained as the 3D image generation model. For example, the preliminary model may be a preliminary GAN model including a preliminary generator and a preliminary discriminator.

The model generation module 440 may be configured to generate the 3D image generation model by training the preliminary model using the plurality of training samples. For example, the model generation module 440 may train the preliminary generator and the preliminary discriminator, and designate the trained generator as the 3D image generation model.

The determination module 450 may be configured to determine the sample 2D image and/or the sample 3D image of the sample subject. For example, the determination module 450 may determine a 2D coordinate of a POI relating to a ROI of the sample subject based on a preliminary sample 2D image, segment a first region corresponding to the ROI of the sample subject based on the 2D coordinate of the POI from the preliminary sample 2D image, and generate the sample 2D image of the sample subject based on the first region. As another example, the determination module 450 may determine a 3D coordinate of the POI based on the 2D coordinate of the POI, and segment a second region corresponding to the ROI of the sample subject from the preliminary sample 3D image and based on the 3D coordinate of the POI, and generate the sample 3D image of the sample subject based on the second region.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 140A and/or the processing device 140B may share two or more of the modules, and any one of the modules may be divided into two or more units. For instance, the processing devices 140A and 1406 may share a same obtaining module; that is, the obtaining module 410 and the obtaining module 440 are a same module. In some embodiments, the processing device 140A and/or the processing device 140B may include one or more additional modules, such a storage module (not shown) for storing data. In some embodiments, the processing device 140A and the processing device 140B may be integrated into one processing device 140.

Figure 5:
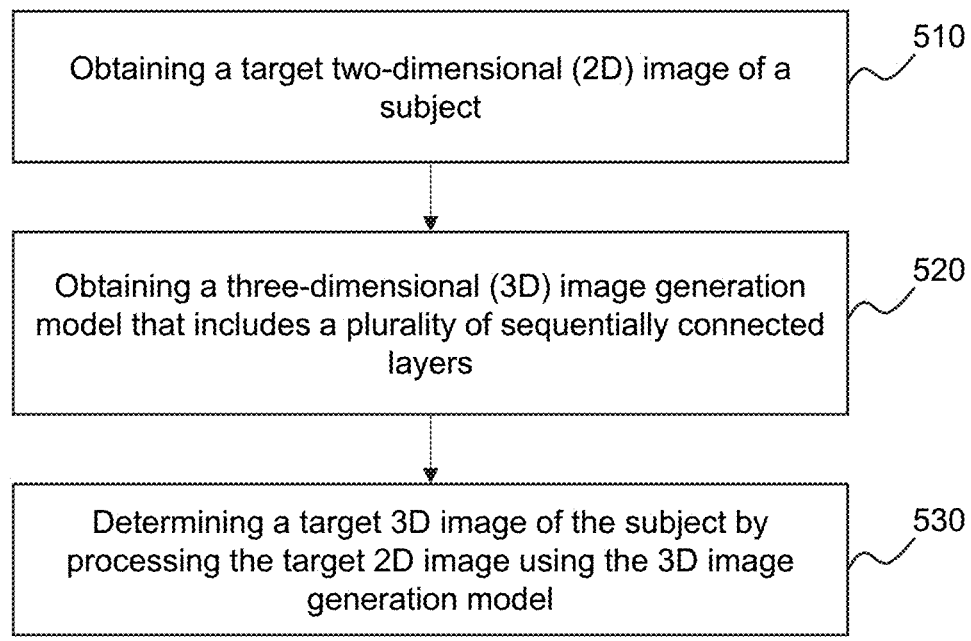
FIG. 5 is a flowchart illustrating an exemplary process for generating a target 3D image of a subject according to some embodiments of the present disclosure.

FIG. 5 is a flowchart illustrating an exemplary process for generating a target 3D image of a subject according to some embodiments of the present disclosure. In some embodiments, one or more operations of process 500 illustrated in FIG. 5 may be implemented in the imaging system 100 illustrated in FIG. 1. For example, the process 500 may be stored in a storage device (e.g., the storage device 150 and/or the storage device 220) of the imaging system 100 in the form of instructions, and invoked and/or executed by the processing device 140A (e.g., the processor 210 of the computing device 200 as illustrated in FIG. 2, the CPU 340 of the mobile device 300 as illustrated in FIG. 3, or one or more modules of the processing device 140A illustrated in FIG. 4A).

In 510, the processing device 140A (e.g., the obtaining module 410) may obtain a target 2D image of the subject.

The subject may include a biological subject and/or a non-biological subject. For example, the subject may include a body of a patient. As another example, the subject may include a specific portion of the patient, such as the upper limb, the abdomen, the head, the thorax, or the like, or a combination thereof. In some embodiments, the target 2D image may include a portion that represents a physical region of interest (ROI) of the subject. Merely by way of example, the subject may be a patient, and the target 2D image may include a portion representing one or more of the head, the chest, the neck, the eyes, the breast, the thyroid of the patient. In some embodiments, the ROI may be selected by a user manually or determined by the processing device 140A according to an actual need.

In some embodiments, the target 2D image may include a medical image generated by a biomedical imaging technique as described elsewhere in this disclosure. For example, the target 2D image may include a CT image, an MRI image, an X-ray image, a PET image, an OCT image, a US image, an IVUS image, a NIRS image, etc. In some embodiments, the target 2D image may correspond to a 2D plane of the subject, such as an axial plane, a sagittal plane, or a coronal plane of the subject.

In some embodiments, the target 2D image of the subject may include a scout image of the subject. As used herein, a scout image of the subject refers to an image used to assist the planning of a subsequent scanning or treatment to be performed on the subject. For example, the scout image may be obtained by performing a pre-scanning (e.g., a CT scanning, an MR scanning, a PET scanning, or the like, or a combination thereof) on the subject. The scout image may provide, for example, contour information, posture information, or the like, of the subject, which may serve as a basis for determining a dose plan for the subsequent scanning or treatment.

The scout image of the subject may include an AP scout image, a PA scout image, a lateral scout image, or a scout image captured from any angle (e.g., 30°, 45°, 60°, etc.) relative to the subject. The AP scout image of the subject may be captured along a direction from the front of the subject to the back of the subject. The PA scout image of the subject may be captured along a direction from the back of the subject to the front of the subject. The lateral scout image of the subject may be captured along a direction from the left of the subject to the right of the subject or a direction from the right of the subject to the left of the subject.

In some embodiments, the processing device 140A may obtain the target 2D image from one or more components of the imaging system 100. For example, the processing device 140A may obtain the target 2D image from the imaging device 110. As another example, the processing device 140A may obtain the target 2D image from a storage device (e.g., the storage device 150, the storage device 220, or the storage 390) of the imaging system 100 via a network (e.g., the network 120). Alternatively, the processing device 140A may obtain the target 2D image from an external source (e.g., a medical database) via a network (e.g., the network 120).

Alternatively, the processing device 140A may generate the target 2D image by processing a 2D image of the subject. The processing of the 2D image may include a denoising operation, an enhancement operation, a smoothing operation, a fusion operation, a segmentation operation, a registration operation, a transformation operation, or the like, or a combination thereof. For example, the processing device 140A may generate the target 2D image by segmenting a portion corresponding to an ROI of the subject from the 2D image. Merely by way of example, the 2D image may be an image of the upper part of a patient. The processing device 140A may segment a region corresponding to the head of the patient from the 2D image, and designate the segmented region as the target 2D image. Using the segmented region as the target 2D image may reduce the amount of data to be processed by the 3D image generation model and improve the generation efficiency of the target 3D image. In some embodiments, the processing of a 2D image may be performed in a similar manner as that of a sample 2D image of a sample subject as described in connection with operation 920 in FIG. 9.

In 520, the processing device 140A (e.g., the obtaining module 410) may obtain a 3D image generation model.

As used herein, a 3D image generation model refers to a model (e.g., a machine learning model) or an algorithm configured to receive a 2D image as an input and output a 3D image or a 3D model corresponding to the 2D image. In some embodiments, the 3D image generation model may include a V-net model, a U-net model, an AlexNet model, an Oxford Visual Geometry Group (VGG) model, a ResNet model, a deep neural network (DNN) model, a multi-layer perceptron (MLP) model, a conventional neural network (CNN) model, a generative adversarial network (GAN) model, a deep convolutional encoder-decoder (DCED) network model, or the like, or any combination thereof.

In some embodiments, the 3D image generation model may include a plurality of sequentially connected layers. At least one of the plurality of sequentially connected layers may include a down-sampling block, a connection block, and an up-sampling block. More descriptions regarding the 3D image generation model may be found elsewhere in the present disclosure. See, e.g., operation 530 and FIG. 6A and the relevant descriptions thereof.

In some embodiments, the 3D image generation model may be obtained from one or more components of the imaging system 100 or an external source. For example, the 3D image generation model may be previously trained by a computing device (e.g., the processing device 140B), and stored in a storage device (e.g., the storage device 150, the storage device 220, and/or the storage 390) of the imaging system 100. The processing device 140A may access the storage device and retrieve the 3D image generation model.

In some embodiments, the 3D image generation model may be generated according to a machine learning algorithm. The machine learning algorithm may include but not be limited to an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof.

In some embodiments, the processing device 140A may obtain the 3D image generation model based on a posture of the subject in the target 2D image. The posture of the subject may reflect one or more of a position, a pose, a shape, etc., of the subject in the target 2D image. In some embodiments, the processing device 140A may determine the posture of the subject by analyzing the 2D image. For example, the processing device 140A may determine the posture of the subject based on position information of a portion (e.g., the head, the neck, a hand, a leg, and/or a foot) of the subject in the target 2D image, position information of one or more feature points (e.g., a shoulder joint, a knee joint, an elbow joint, and/or an ankle joint) of the subject in the target 2D image, contour information (e.g., a shape, a size, etc.) of a portion of the subject, or the like, or any combination thereof.

As another example, the processing device 140A may determine the posture of the subject by processing the target 2D image using a posture determination model. Merely by way of example, the posture determination model may include a trained classification model, such as an AlexNet model, a Visual Geometry Group (VGG) Net model, a GoogleNet model, a ResNet model, a SqueezeNet model, a SegNet model, an Inception model, a MobileNet model, or the like, or any combination thereof. In some embodiments, the target 2D image may be acquired by performing a pre-scanning on the subject using an imaging device. The processing device 140A may determine the posture of the subject in the target 2D image based on a scanning protocol according to which the pre-scanning is performed and/or position information (e.g., a scanning view, a position of a gantry, etc.) of the imaging device during the pre-scanning.

In some embodiments, a plurality of candidate 3D image generation models corresponding to a plurality of postures may be previously generated and stored in a model library. For example, the plurality of candidate 3D image generation models may correspond to an AP posture, a PA posture, a lateral posture, or the like, or any combination thereof. The processing device 140A may select a candidate 3D image generation model corresponding to the posture of the subject from the candidate 3D image generation models, and designate the selected candidate 3D image generation model as the 3D image generation model. For example, if the subject holds an AP posture in the target 2D image, the processing device 140A may select a candidate 3D image generation model corresponding to the AP posture as the 3D image generation model. By previously generating the candidate 3D image generation models and selecting the 3D image generation model from the candidate 3D image generation models, the generation efficiency of the target 3D image may be improved. In addition, using the 3D image generation model corresponding to the posture of the subject may improve the accuracy of the generated target 3D image.

In some embodiments, the 3D image generation model may be a trained model or a portion of the trained model generated by a computing device (e.g., the processing device 140B) by performing a process (e.g., process 900) for generating a 3D image generation model disclosed herein. More descriptions regarding the generation of the 3D image generation model may be found elsewhere in the present disclosure. See, e.g., FIG. 9 and relevant descriptions thereof.

In 530, the processing device 140A (e.g., the determination module 420) may determine a target 3D image of the subject by processing the target 2D image using the 3D image generation model.

The target 3D image may include a 3D representation (e.g., model) of the subject or a portion (e.g., the ROI) of the subject. In some embodiments, the processing device 140A may input the target 2D image into the 3D image generation model, and the 3D image generation model may process the target 2D image and output the target 3D image.

Figure 6A:
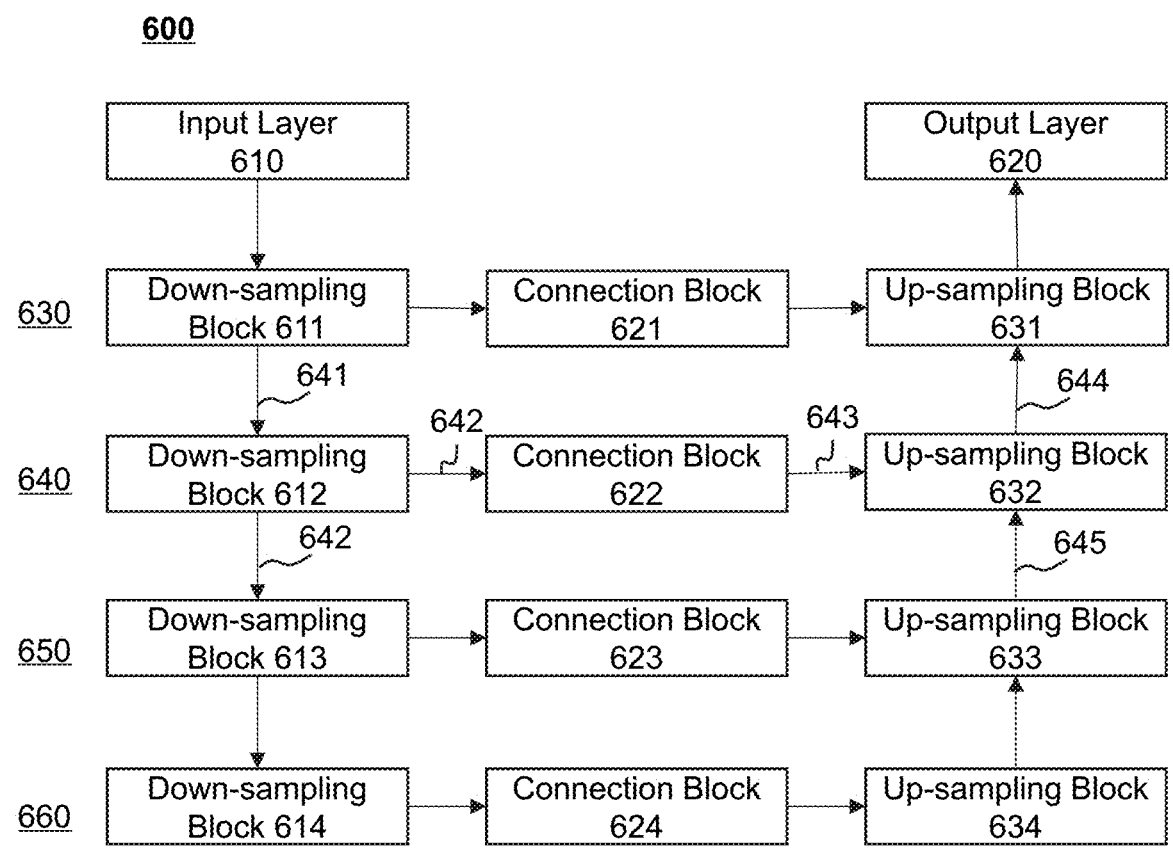
FIG. 6A is a schematic diagram illustrating an exemplary 3D image generation model according to some embodiments of the present disclosure.

For illustration purposes, FIG. 6A illustrates an exemplary 3D image generation model 600 according to some embodiments of the present disclosure. The generation of the target 3D image using the 3D image generation model 600 is described hereinafter as an example.

As shown in FIG. 6A, the 3D image generation model 600 may include an input layer 610, an output layer 620, and four middle layers 630, 640, 650, and 660. A middle layer 630 may include a down-sampling block 611, a connection block 621, and an up-sampling block 631. A middle layer 640 may include a down-sampling block 612, a connection block 622, and an up-sampling block 632. A middle layer 650 may include a down-sampling block 613, a connection block 623, and an up-sampling block 633. A middle layer 660 may include a down-sampling block 614, a connection block 624, and an up-sampling block 634.

In some embodiments, in a middle layer, the connection block may be connected to the down-sampling block and the up-sampling block via, for example, a skip connection. The utilization of the skip connection may improve the convergence speed for training the 3D image generation model 600 and the accuracy of the 3D image generation model 600.

The input layer 610 may be configured to receive a model input (e.g., a target 2D image) and generate a plurality of 2D feature maps by coding the model input. The four middle layers of the 3D image generation model 600 may be configured to process the model input received from the input layer 610. The output layer 620 may be configured to output a model output (e.g., a target 3D image) based on the processing result generated by the four middle layers.

In some embodiments, the down-sampling block of a specific middle layer may be configured to generate a plurality of 2D feature maps by coding an input of the down-sampling block. The input of the down-sampling block may include an output generated by a previous layer of the specific middle layer. The connection block of the specific middle layer may be configured to generate at least one 3D feature map based on the plurality of 2D feature maps. The up-sampling block of the specific middle layer may be configured to generate at least one target 3D feature map associated with the target 3D image by processing the at least one 3D feature map. Taking the middle layer 640 as an example, the down-sampling block 612 may be configured to receive a plurality of 2D feature maps 641 generated by the down-sampling block 611 of the middle layer 630, and generate a plurality of 2D feature maps 642 by encoding the 2D feature maps 641. The 2D feature maps 642 may be transmitted to the down-sampling block 613 of the next middle layer 650 and the connection block 622 for further processing.

The coding of the 2D feature maps 641 may include one or more processing operations, such as a convolution operation, a normalization operation, a transformation operation, or the like, or any combination thereof. For example, the down-sampling block 612 may include a 2D convolution unit (e.g., a 2D convolution unit with a stride 2) and a 2D residual unit. In some embodiments, the 2D convolution unit may include one or more 2D convolutional layers (e.g., two 2D convolutional layers), a first batch normalization layer, and a first activation layer. The 2D convolution layer(s) may be configured to perform one or more convolution operations. The first batch normalization layer may be configured to perform data normalization. The first activation layer may include an activation function configured to perform a nonlinear transformation. The activation function may include a Sigmoid function, a Tan h function, a rectified linear unit (ReLU) function, a Swish function, etc.

Figure 6B:
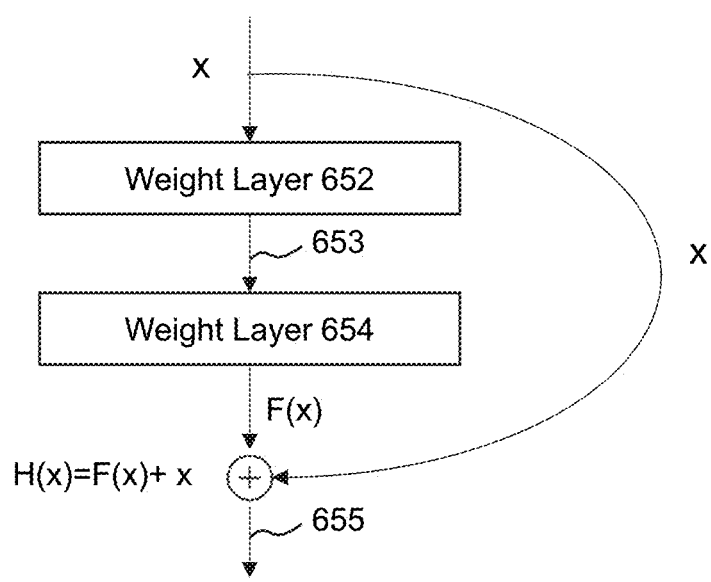
FIG. 6B is a schematic diagram illustrating an exemplary residual unit according to some embodiments of the present disclosure.

The 2D residual unit may be configured to reduce vanishing gradients and/or increase the layers of the 3D image generation model 600, thereby improving the accuracy of the 3D image generation model 600. For illustration purposes, FIG. 6B illustrates an exemplary 2D residual unit according to some embodiments of the present disclosure. As shown in FIG. 6B, the 2D residual unit 650 may include a plurality of weight layers (e.g., a weight layer 652 and a weight layer 654), a plurality of ReLU layers (e.g., a ReLU layer 653 and a ReLU layer 655). Each of the weight layers may be a convolution layer (e.g., a 3*3 convolution layer) and configured to perform one or more convolution operations. Each of the plurality of ReLU layers may be configured to perform a nonlinear transformation. In some embodiments, an input x (e.g., a feature map received from the 2D convolution unit) may be inputted into the 2D residual unit 650. The weight layers and the ReLU layer 653 may process the input x and generate an output F(x). The original input x and the output F(x) may be added together to generate an input H(x) of the ReLU layer 655. The ReLU layer 655 may generate an output of the 2D residual unit 650 based on the input H(x).

In some embodiments, the image resolution (or scale) of the 2D feature maps 642 outputted by the down-sampling block 612 may be lower than that of the 2D feature maps 641 received by the down-sampling block 612. For example, the down-sampling block 612 may receive 256 feature maps with a certain resolution and output 512 feature maps with a lower resolution than the certain resolution.

The connection block 622 may be configured to generate at least one 3D feature map 643 by processing the 2D feature maps 642. For example, the connection block 622 may perform process 700 as described in connection with FIG. 7 to generate the at least one 3D feature map 643. In some embodiments, the connection block 622 may include a channel re-composition unit and a 3D convolution unit. The channel re-composition unit may be configured to generate at least one combined 3D feature map by combining two or more of the plurality of first 2D feature maps. The 3D convolution unit may include one or more 3D convolution layers (e.g., two 3D convolution layers), a second batch normalization layer, and a second activation layer. The 3D convolution layer may be configured to perform one or more 3D convolution operations. The second batch normalization layer may be configured to perform data normalization. The second activation layer may include an activation function configured to perform a nonlinear transformation. The activation function of the second activation layer may be similar to that of the first activation layer as aforementioned.

The connection block 622 may transmit the at least one 3D feature map 643 to the up-sampling block 632. The up-sampling block 632 may generate at least one target 3D feature map 644 associated with the target 3D image by processing the at least one 3D feature map 643. In some embodiments, as shown in FIG. 6A, the input of the up-sampling block 632 may further include at least one 3D feature map 645 outputted by the up-sampling block 633 of the next middle layer 650. The up-sampling block 632 may generate the at least one target 3D feature map 644 based on the at least one 3D feature map 643 and the at least one 3D feature map 645. In some embodiments, a scale (or image resolution) of the at least one 3D feature map 643 received from the connection block 622 may be different from that of the at least one 3D feature map 645 outputted by the up-sampling block 633. The at least one 3D feature map 643 may be cropped or resampled to generate at least one processed 3D feature map having the same scale (or resolution) as the at least one 3D feature map 645. The at least one process 3D feature map and the at least one 3D feature map 645 may be inputted into up-sampling block 632.

In some embodiments, the up-sampling block 632 may generate at least one target 3D feature map by performing one or more operations including, for example, a deconvolution operation, a normalization operation, a transformation operation, or the like, or any combination thereof, on its input. For example, the up-sampling block 632 may include a 3D deconvolution unit and a 3D residual unit. The 3D deconvolution unit may include one or more 3D deconvolution layers, a third batch normalization layer, a third activation layer, etc. The 3D deconvolution layer(s) may be configured to perform one or more deconvolution operations. The third batch normalization layer may be configured to perform data normalization. The third activation layer may include an activation function configured to perform a nonlinear transformation. The 3D residual unit may include a plurality of 3D residual layers. The 3D residual unit may be similar to the 2D residual layer of the down-sampling block 612 except that the 3D residual unit processes data in 3D data space while the 2D residual unit processes data in 2D data space. In some embodiments, the image resolution (or scale) of the target 3D feature map 644 outputted by the up-sampling block 632 may be greater than that of the 3D feature map 643.

In some embodiments, the up-sampling block 632 may transmit the at least one target 3D feature map 644 to the up-sampling block 631 of the middle layer 630. The up-sampling block 631 may process the at least one target 3D feature map 644 and an input received from the connection block 621. The output of the up-sampling block 631 may be transmitted to the output layer 620, and the output layer 620 may generate the target 3D image by processing the output of the up-sampling block 631.

It should be noted that the above descriptions regarding FIGS. 5 and 6 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. The operations of the illustrated process 500 are intended to be illustrative. In some embodiments, the process 500 may be accomplished with one or more additional operations not described, and/or without one or more of the operations discussed. Additionally, the order in which the operations of the process 500 as illustrated in FIG. 5 and described above is not intended to be limiting.

The 3D image generation model may be modified according to an actual need. For example, the 3D image generation model 600 may include any count (or number) of layers. Each layer may include any count and/or type of blocks. Merely by way of example, the count of the down-sampling blocks, the count of the connection blocks, and the count of the up-sampling blocks of the 3D image generation model may be equal to 3, 5, 7, etc.

As another example, the 3D image generation model 600 may include one or more additional components and/or one or more components (e.g., one or more connection layers) of the 3D image generation model 600 may be omitted. As yet another example, a component of the 3D image generation model 600 may be replaced by another component that may implement the same or similar functions. Merely by way of example, the 2D residual unit 650 may be replaced by another unit (e.g., a dense unit) that can perform the same functions as or similar functions to the 2D residual unit 650.

In some embodiments, the 3D image generation model 600 may be implemented on one or more processing devices (e.g., the processing device 140, the processor 210 of the computing device 200). For example, a plurality of processing devices may execute a parallel processing operation in some layers of the 3D image generation model 600 by, for example, assigning two or more processing devices for an operation of different nodes (e.g., a kernel, a pooling node, a neuron) in the 3D image generation model 600. Merely by way of example, a first GPU may execute the operation corresponding to the kernel A and kernel B, and a second GPU may execute the operation corresponding to the kernel C and kernel D. Similarly, a plurality of GPUs may also execute the operation of other nodes (e.g., a kernel, a pooling node, a neuron) in the 3D image generation model 600. In addition, in some embodiments, a storage device (e.g., the storage device 150, the storage device 220 of the computing device 200) may be provided for storing data related to the 3D image generation model 600, such as activations and learned weights for each node.

According to some embodiments of the present disclosure, a target 3D image of a subject may be generated by processing a single target 2D image (e.g., a scout image) of the subject using a 3D image generation model. Merely by way of example, a 3D image generation model corresponding to an AP posture may be configured to generate the target 3D image based on a single anteroposterior scout image of the subject. The 3D image generation model may include one or more specific components for feature extraction and/or combination. For example, the 3D image generation model may include a specific connection block for combining 2D feature maps into 3D feature map(s). Conventionally, two or more 2D images corresponding to different views of the subject may need to be acquired for generating a target 3D image. Compared with the conventional approach, the systems and methods disclosed herein may obviate the need of acquiring multiple 2D images of the subject, which may improve the efficiency of 3D image generation by, for example, reducing the scanning time, the processing time, the computational complexity and/or cost.

In some embodiments, the 3D image generation model 600 may be used to output a target 3D image by processing a plurality of target 2D images of the subject. For example, an AP scout image and a lateral scout image of the subject may be inputted into the 3D image generation model 600 and the 3D image generation model 600 may generate the target 3D image by processing the inputted images.

Figure 7:
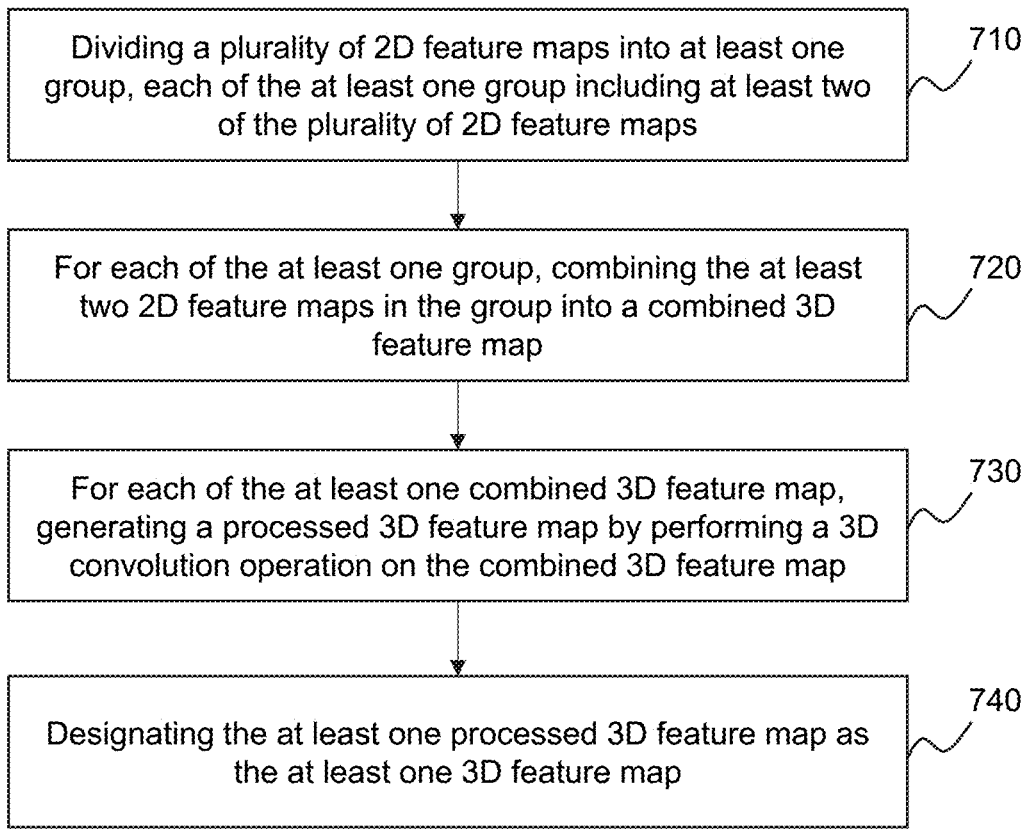
FIG. 7 is a flowchart illustrating an exemplary process for determining at least one 3D feature map according to some embodiments of the present disclosure.

FIG. 7 is a flowchart illustrating an exemplary process 700 for determining at least one 3D feature map according to some embodiments of the present disclosure. In some embodiments, one or more operations of the process 700 may be performed to achieve at least a portion of operation 530 as described in connection with FIG. 5. In some embodiments, one or more operations of process 700 illustrated in FIG. 7 may be implemented in the imaging system 100 illustrated in FIG. 1. For example, the process 700 may be stored in a storage device (e.g., the storage device 150 and/or the storage device 220) of the imaging system 100 in the form of instructions, and invoked and/or executed by the processing device 140A (e.g., the processor 210 of the computing device 400 as illustrated in FIG. 2, the CPU 340 of the mobile device 300 as illustrated in FIG. 3, or one or more modules of the processing device 140A illustrated in FIG. 4A). As another example, the process 700 may be invoked and/or executed by a connection block of a 3D image generation model (e.g., the connection blocks 621, 622, 623, and 624 of the 3D image generation model 600). For illustration purposes, the implementation of the process by the connection block 622 of the 3D image generation model 600 is described hereinafter as an example.

In 710, the connection block 622 may divide the plurality of 2D feature maps 642 into at least one group.

Each of the at least one group may include at least two of the plurality of 2D feature maps 642. Merely by way of example, if the count of the plurality of 2D feature maps 642 is M, the connection block 622 may divide the plurality of the 2D feature maps 642 into (M/N) groups, and each of the groups may include N 2D feature maps. In some embodiments, a count of the at least one group may be a preset value (e.g., 2, 5, 6, 8, 10, etc.), or a value that can be dynamically adjusted by the connection block 622 according to different conditions. In some embodiments, different groups may include a same count or different counts of 2D feature maps.

In 720, for each of the at least one group, the connection block 622 may combine (or concatenate) the at least two 2D feature maps in the group into a combined 3D feature map.

In some embodiments, the at least two 2D feature maps may be concatenated along a preset dimension (e.g., a channel dimension). For example, the at least two 2D feature maps may both be 2-dimensional images including a first dimension and a second dimension. The at least two 2D feature maps may be concatenated along a third dimension to generate the combined 3D feature map (e.g., a 3-dimensional feature map including the first, second and third dimensions).

Figure 8:
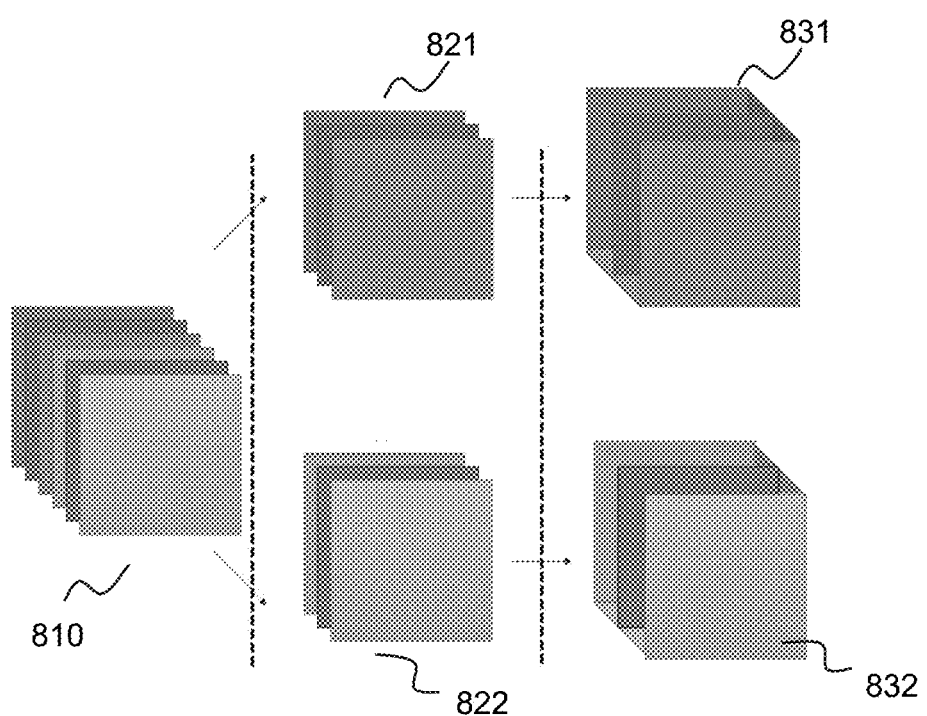
FIG. 8 is a schematic diagram illustrating an exemplary process of generating at least one combined 3D feature map according to some embodiments of the present disclosure.

For illustration purposes, FIG. 8 illustrates a schematic diagram of an exemplary process of generating at least one combined 3D feature map according to some embodiments of the present disclosure. As shown in FIG. 8, six 2D feature maps 810 may be divided into two groups (i.e., a group 821 and a group 822). Each of the groups 821 and 822 may include three 2D feature maps. The three 2D feature maps in the group 821 may be combined to generate a combined 3D feature map 831, and the three 2D feature maps in the group 822 may be combined to generate a combined 3D feature map 832.

In 730, for each of the at least one combined feature map, the connection block 622 may generate a processed 3D feature map by performing a 3D convolution operation on the combined 3D feature map. For example, the connection block 622 may perform the 3D convolution operation on a combined 3D feature map, e.g., using a 3D convolution kernel (e.g., a 3*3*3 kernel). In some embodiments, the connection block 622 may further perform a data normalization operation and/or a nonlinear transformation on the combined 3D feature map.

In 740, the connection block 622 may designate the at least one processed 3D feature map as the at least one 3D feature map.

It should be noted that the above description regarding the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. The operations of the illustrated process 700 are intended to be illustrative. In some embodiments, the process 700 may be accomplished with one or more additional operations not described, and/or without one or more of the operations discussed. For example, the operation 730 may be omitted, and the connection block 622 may directly designate the at least one combined 3D feature map of the at least one group as the at least one 3D feature map.

Figure 9:
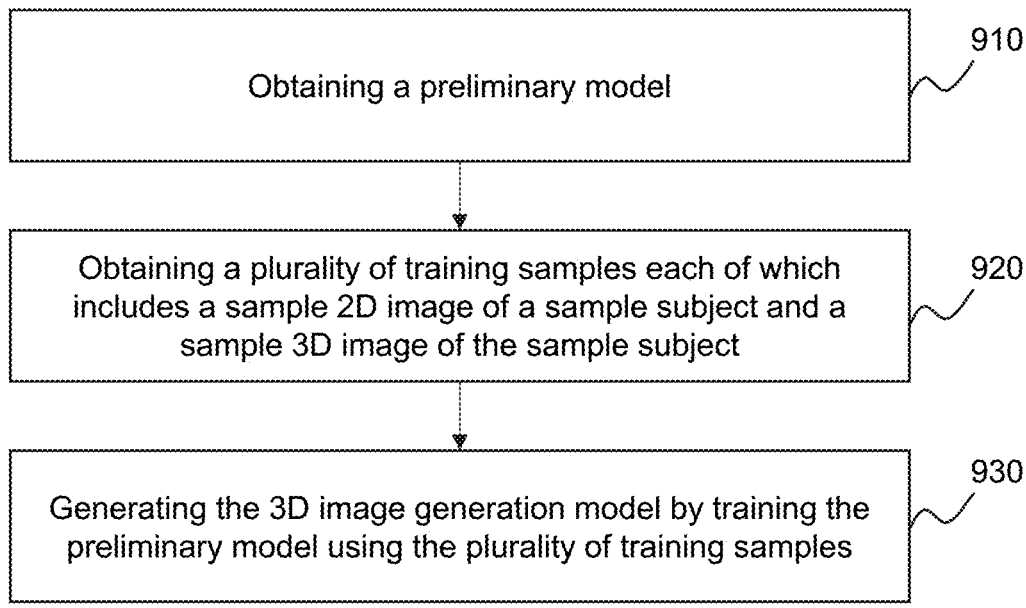
FIG. 9 is a flowchart illustrating an exemplary process for generating a 3D image generation model according to some embodiments of the present disclosure.

FIG. 9 is a flowchart illustrating an exemplary process for generating a 3D image generation model according to some embodiments of the present disclosure. In some embodiments, one or more operations of process 900 illustrated in FIG. 9 may be implemented in the imaging system 100 illustrated in FIG. 1. For example, the process 900 may be stored in a storage device (e.g., the storage device 150 and/or the storage device 220) of the imaging system 100 in the form of instructions, and invoked and/or executed by the processing device 140B (e.g., the processor 210 of the computing device 400 as illustrated in FIG. 2, the CPU 340 of the mobile device 300 as illustrated in FIG. 3, or one or more modules of the processing device 140B illustrated in FIG. 4B).

In some embodiments, the 3D image generation model described in connection with operation 520 in FIG. 5 may be obtained according to the process 900. In some embodiments, the process 900 may be performed by another device or system other than the imaging system 100, e.g., a device or system of a vendor of the 3D image generation model. For illustration purposes, the implementation of the process 900 by the processing device 140B is described as an example.

In 910, the processing device 140B (e.g., the obtaining module 430) may obtain a preliminary model.

The preliminary model may be any type of model to be trained as the 3D image generation model. For example, the preliminary model may include a V-net model, a U-net model, an AlexNet model, an Oxford Visual Geometry Group (VGG) model, a ResNet model, a deep neural network (DNN) model, a multi-layer perceptron (MLP) model, a conventional neural network (CNN) model, a GAN model, a deep convolutional encoder-decoder (DCED) network model, or the like, or any combination thereof. In some embodiments, the preliminary model may have a same structure as or a similar structure to the 3D image generation model 600 as shown in FIG. 6A.

In 920, the processing device 140B (e.g., obtaining module 430) may obtain a plurality of training samples. Each of the training samples may include a sample 2D image of a sample subject and a sample 3D image of the sample subject.

The sample subject of a training sample may be of the same type as or a different type from the subject as described in connection with operation 510. Two subjects may be deemed as belonging to a same type if they correspond to a same organ or tissue. The sample 2D image and the sample 3D image may be of the same type as or a different type from the target 2D image as described in connection with operation 510. Two images may be deemed as belonging to a same type if they are acquired by a same imaging modality. In some embodiments, the sample subjects of different training samples may be different, so that the generated 3D image generation model with a wider application scope (e.g., can be used to generate 3D target images of different organs or tissues).

In some embodiments, the sample 2D image of a training sample may be acquired by performing a 2D scan on the corresponding sample subject using a specific imaging device (e.g., the imaging device 110). The sample 3D image of the training sample may be acquired by performing a 3D scan on the corresponding sample subject using the imaging device or another imaging device. For example, a CT scanner may be directed to perform a 2D scan on the sample subject to obtain a sample 2D image (e.g., a 2D scout image), and a spiral scan on the subject to obtain a sample 3D image. During the obtaining of the sample 2D image and the sample 3D image, the subject may hold the same (or substantially the same) posture.

In some embodiments, the sample 2D image of the sample subject may include a scout image of the sample subject. The scout image of the sample subject may include an anteroposterior scout image, a lateral scout image, or a scout image captured by an imaging device from any angle relative to the sample subject. In some embodiments, the sample 2D images of different training samples may correspond to a same posture or different postures. For example, the sample 2D image of each training sample may be an anteroposterior scout image acquired when the corresponding sample subject holds an AP posture. The anteroposterior scout images of the training samples may be used to train a 3D image generation model corresponding to the AP posture. The 3D image generation model corresponding to the AP posture may be used to generate a target 3D image of a subject based on an anteroposterior scout image of the subject. As another example, the sample 2D image of each training sample may be a lateral scout image acquired when the corresponding sample subject holds a lateral posture. The lateral scout images of the training samples may be used to train a 3D image generation model corresponding to the lateral posture.

In some embodiments, the sample 2D image and/or the sample 3D image of a training sample may be captured by an imaging device and stored in a storage device (e.g., the storage device 150 and/or the storage device 220 of the imaging system 100). The processing device 140B may obtain the sample 2D image and/or the sample 3D image from the storage device.

Alternatively, the sample 2D image and/or the sample 3D image may be generated by the processing device 140B. Merely by way of example, the processing device 140B may obtain a preliminary sample 2D image and a preliminary sample 3D image of the sample subject. The preliminary sample 2D image may be acquired by a 2D scan (e.g., a scout scan) performed on the sample subject, and the preliminary sample 3D image may be acquired by a 3D scan (e.g., spiral scan) performed on the sample subject. The processing device 140B may further generate the sample 2D image by processing the preliminary sample 2D image and generate the sample 3D image by processing the preliminary sample 3D image. The processing of the preliminary sample 2D image and/or the preliminary sample 3D image may include a denoising operation, an enhancement operation, a smoothing operation, a fusion operation, a segmentation operation, a registration operation, a transformation operation, or the like, or a combination thereof.

In some embodiments, the processing device 140B may determine a 2D coordinate of a POI (e.g., a gravity) relating to an ROI of the sample subject. The processing device 140B may further generate the sample 2D image and the sample 3D image of the sample subject based on the 2D coordinate of the POI. In this way, the sample 2D image and the sample 3D image may be aligned, thereby improving the accuracy of the 3D image generation model generated based thereon. More descriptions regarding the generation of the sample 2D image and the sample 3D image may be found elsewhere in the present disclosure. See, e.g., FIG. 10 and relevant descriptions thereof.

In 930, the processing device 140B (e.g., the model generation model 440) may generate the 3D image generation model by training the preliminary model using the plurality of training samples.

The preliminary model to be trained may have one or more model parameters. Exemplary model parameters may include the number (or count) of layers, the number (or count) of nodes, a loss function, or the like, or any combination thereof. Before training, the model parameter(s) may have their respective initial values. In the training of the preliminary model, the value(s) of the model parameter(s) of the preliminary model may be updated.

In some embodiments, the training of the preliminary model may include one or more iterations to iteratively update the model parameter(s) of the preliminary model. For illustration purposes, an exemplary current iteration of the iteration(s) is described in the following description. The current iteration may be performed based on at least a portion of the training samples. In some embodiments, a same set or different sets of training samples may be used in different iterations in training the preliminary model. For brevity, the training samples used in the current iteration are referred to as target training samples. In the current iteration, the updated preliminary model generated in a previous iteration may be evaluated. For example, for each target training sample, the processing device 140B may determine a predicted 3D image by processing an inputted sample 2D image using an updated preliminary model generated in a previous iteration. The processing device 140B may then determine a value of the loss function of the updated preliminary model based on the predicted 3D image and the sample 3D image of each target training sample.

The loss function may be used to evaluate the accuracy and reliability of the updated preliminary model, for example, the smaller the loss function is, the more reliable the updated preliminary model is. Exemplary loss functions may include an L1 loss function, a focal loss function, a log loss function, a cross-entropy loss function, a Dice loss function, an L2 loss function, a mean bias error (MBE) function, a mean square error (MSE) function, etc. The processing device 140B may further update the value(s) of the model parameter(s) of the updated preliminary model to be used in a next iteration based on the value of the loss function according to, for example, a backpropagation algorithm.

In some embodiments, the one or more iterations may be terminated until a termination condition is satisfied in the current iteration. Exemplary termination conditions may be that the value of the loss function obtained in the certain iteration is less than a threshold value, that a certain count of iterations has been performed, that the loss function converges such that the difference of the values of the loss function obtained in a previous iteration and the current iteration is within a threshold value, etc. If the termination condition is satisfied in the current iteration, the processing device 140B may designate the updated preliminary model (or a portion thereof) as the 3D image generation model.

In some embodiments, the preliminary model may be a preliminary GAN model including a preliminary generator and a preliminary discriminator (e.g., a 3D Patch GAN discriminator). During the training of the preliminary GAN model, the preliminary generator may be configured to output the predicted 3D image of each target training sample, and the preliminary discriminator may be configured to generate a discrimination result between the predicted 3D image (i.e., fake data) and the sample 3D image (i.e., true data) of each target training sample. The preliminary generator may be trained to generate the predicted 3D image similar to the sample 3D image to make the preliminary discriminator determines that the predicted 3D image is not synthesized. The preliminary discriminator may be trained to improve its ability to distinguish the preliminary generator's fake data from the true data. In some embodiments, the trained model may include a trained generator trained from the preliminary generator and a trained discriminator trained from the preliminary discriminator. The processing device 140B may designate the trained generator as the 3D image generation model.

In some embodiments, the 3D image generation model may be applied for various scenarios. For example, the 3D image generation model may be trained to determine a target 3D image of a subject as illustrated in FIG. 5. As another example, the 3D image generation model may be trained to segment an ROI from an image of a subject. Merely by way of example, the 3D image generation model may output a representation indicating the head (e.g., the head at a predetermined angle) of a patient by processing one or more images of the subject. As another example, the 3D image generation model may be trained to determine one or more parameters (e.g., a posture, a thickness, a size, etc.) associated with a subject. As yet another example, the 3D image generation model may be trained to generate one or more processed images. Merely by way of example, the 3D generation model may output one or more images with a relatively high resolution by processing at least one original image with a relatively low resolution.

It should be noted that the above description regarding the process 900 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be added or omitted. For example, after the 3D image generation model is generated, the processing device 1406 may further test the 3D image generation model using a set of testing images. Additionally or alternatively, the processing device 140B may update the 3D image generation model periodically or irregularly based on one or more newly-generated training samples (e.g., new images generated in medical diagnosis).

Figure 10:
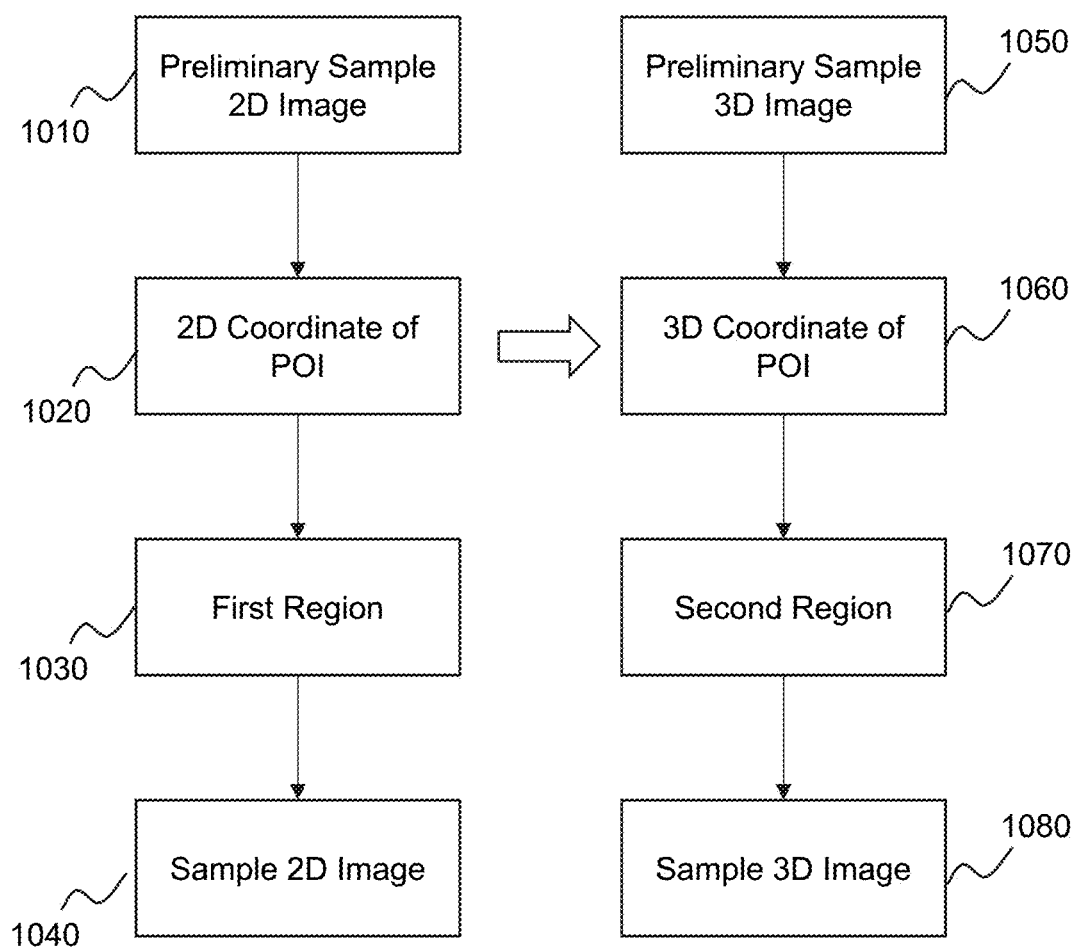
FIG. 10 is a schematic diagram illustrating an exemplary process for generating a training sample according to some embodiments of the present disclosure.

FIG. 10 is a flowchart illustrating an exemplary process for generating a sample 2D image and a sample 3D image of a training sample according to some embodiments of the present disclosure. As shown in FIG. 10, the sample 2D image of the training sample may be generated by performing operations 1010-1040, and the sample 3D image of the training sample may be generated by performing operations 1050-1080.

In 1010, the processing device 140B (e.g., the obtaining module 430) may obtain a preliminary sample 2D image of a sample subject of the training sample.

The preliminary sample 2D image may be generated by performing a 2D scan on the corresponding sample subject using a specific imaging device (e.g., the imaging device 110). The preliminary sample 3D image may be generated by performing a 3D scan on the corresponding sample subject using the imaging device or another imaging device. The obtaining of the preliminary sample 2D image and/or the preliminary sample 3D image may be the same as or similar to that of the sample 2D image and/or the sample 3D image as described in connection with FIG. 9. In some embodiments, the preliminary sample 2D image of the sample subject may include a scout image of the sample subject.

In 1020, the processing device 140B (e.g., the determination module 450) may determine a 2D coordinate of a POI relating to an ROI of the sample subject.

The ROI of the sample subject may include any region of interest of the sample subject. For example, the sample subject may be a sample patient, and the ROI may be the head and the eyes of the sample patient. The POI relating to the ROI may include, for example, a gravity center point, a center point, or any determined point of the ROI of the sample subject. The 2D coordinate of the POI may be a coordinate of the POI in a 2D coordinate system. For example, when the preliminary sample 2D image is an anteroposterior scout image of the sample subject, the 2D coordinate of the POI may be a coordinate of the POI on the XOY plane of the coordinate system 160 as shown in FIG. 1 (e.g., represented as (x1, y1)). As another example, when the preliminary sample 2D image is a lateral scout image of the sample subject, the 2D coordinate of the POI may be represented as a coordinate of the POI on the XOZ plane of the coordinate system 160 (e.g., represented as (x2, z2)).

In some embodiments, the processing device 140B may determine the 2D coordinate of the POI relating to the ROI of the sample subject based on, e.g., a recognition algorithm. For example, the processing device 140B may determine a first line corresponding to the boundary of the ROI (e.g., a line corresponding to the top of the head of the sample subject) in the preliminary sample 2D image. For example, the processing device 140B may traverse rows of the preliminary sample 2D image until a termination condition is satisfied, and determine the row where the termination condition is satisfied as the first line. Exemplary termination conditions may include that the count of target pixels in a row is within a count range. A target pixel refers to a pixel having a gray value within a gray value range. Merely by way of example, the grey value range may be [−950, −850], [−1000, −900], [−900, −800], or the like. The count range may be [80, 700], [100, 700], [120, 500], or the like. In some embodiments, the count range and/or the gray range may be dynamically adjusted by the processing device 140B according to different conditions. For example, the grey range may be determined according to a grey distribution of the ROI in the preliminary sample 2D image. As another example, the count range may be determined according to a width of the ROI of the sample subject.

The processing device 140B may then determine a second line that has a specific distance with respect to the first line. The distance between the second line and the first line may be a preset value, or a value that can be dynamically adjusted by the processing device 140B according to different conditions (e.g., a length of the ROI). The processing device 140B may further determine the 2D coordinate of the POI based on the first line and the second line. For example, the processing device 140B may determine a 2D coordinate of a gravity center or a center point of a region of the preliminary sample 2D image between the first line and the second line in the 2D coordinate system, and designate the determined 2D coordinate as the 2D coordinate of the POI relating to the ROI of the sample subject.

In 1030, the processing device 140B (e.g., the determination module 450) may segment a first region corresponding to the ROI of the sample subject from the preliminary sample 2D image based on the 2D coordinate of the POI.

For example, based on the 2D coordinate of the POI, the processing device 140B may determine a first bounding box that is centered on the POI and have a predetermined size in the preliminary sample 2D image. The processing device 140B may segment a region enclosed by the first bounding box from the preliminary sample 2D image and designate the segmented region as the first region. As used herein, a bounding box may have any shape, such as the shape of a square, a rectangle, a triangle, a polygon, a circle, an ellipse, an irregular shape, or the like. Merely by way of example, the first bounding box may be a square having a side length of 256 millimeters. In some embodiments, the size of the first bounding box may be determined based on the organ type of the ROI. Merely by way of example, the processing device 140B may determine that the first bounding box has a perimeter of 20~60 cm when the ROI is the head of the sample subject.

In 1040, the processing device 140B (e.g., the determination module 450) may generate the sample 2D image based on the first region.

For example, the processing device 140B may designate the first region as the sample 2D image. Alternatively, the processing device 140B may resample the first region according to a predetermined image resolution (e.g., 256*256, 640*480, etc.). The processing device 140B may then designate the resampled first region as the first region.

In 1050, the processing device 140B (e.g., the obtaining module 430) may obtain a preliminary sample 3D image of the sample subject of the training sample. The obtaining of the preliminary sample 3D image of the sample subject of the training sample may be found elsewhere in the present disclosure. See, e.g., operation 1010 and the relevant descriptions thereof.

In 1060, the processing device 140B (e.g., the determination module 450) may determine a 3D coordinate of the POI based on the 2D coordinate of the POI.

As described in connection with operation 1020, the 2D coordinate of the POI may be a coordinate of the POI in a 2D coordinate system. The 3D coordinate of the POI may be a coordinate of the POI in a 3D coordinate system. In some embodiments, the 3D coordinate system may include three axes, two of which may be the same as the two axes of the 2D coordinate system. For illustration purposes, it is assumed that the preliminary sample 2D image is an anteroposterior scout image, the 2D coordinate of the POI is represented as (x1, z1) on the XOY plane of the coordinate system 160, and the 3D coordinate of the POI is represented as (x1, y1, z1) in the coordinate system 160.

To determine the 3D coordinate of the POI, the processing device 140B may generate a projection image corresponding to the lateral view based on the preliminary sample 3D image, for example, by projecting the preliminary sample 3D image along the Z-axis direction of the coordinate system 160. The processing device 140B may then determine a coordinate range in the projection image based on the 2D coordinate of the POI. For example, the coordinate range may be represented as (z1−a, z1+a), wherein a may have any suitable value. The processing device 140B may further determine a first Y-axis coordinate of the gravity point of the projection image within the coordinate range, and designate the first Y-axis coordinate as the Y-axis coordinate of the POI (i.e., y1). Alternatively, the processing device 140B may determine a second Y-axis coordinate of the gravity point of the original preliminary sample 3D image within the coordinate range, and designate the second Y-axis coordinate as the Y-axis coordinate of the POI (i.e., y1).

It should be noted that the above description regarding the determination of the 3D coordinate of the POI is merely provided for the purposes of illustration, and not intended to limit the scope of the present disclosure. For example, the preliminary sample 2D image may be a lateral scout image of the sample subject, and the processing device 140B may project the preliminary sample 3D image along the X-axis direction of the coordinate system 160. The processing device 140B may then determine a coordinate range in the projection image based on the 2D coordinate of the POI. For example, the coordinate range may be represented as (z1−b, z1+b), wherein b may have any suitable value. The processing device 140B may further determine a third X-axis coordinate of the gravity point of the projection image within the coordinate range, and designate the third X-axis coordinate as the X-axis coordinate of the POI (i.e., x3). Alternatively, the processing device 140B may determine a fourth Z-axis coordinate of the gravity point of the original preliminary sample 3D image within the coordinate range, and designate the fourth Z-axis coordinate as the X-axis coordinate of the POI (i.e., x3).

In some embodiments, the processing device 140B may segment a region corresponding to the ROI of the subject from the preliminary sample 3D image, and further determine the 3D coordinate of the POI based on the 2D coordinate of the POI and the segmented region. The determination of the 3D coordinate of the POI based on the segmented region may be performed in a similar as that based on the original preliminary sample 3D image, and the descriptions thereof are not repeated here.

In 1070, the processing device 140B (e.g., the determination module 450) may segment a second region corresponding to the ROI of the sample subject from the preliminary sample 3D image based on the 3D coordinate of the POI.

For example, based on the 3D coordinate of the POI, the processing device 140B may determine a 3D region that is centered on the 3D coordinate of the POI and a have a predetermined size in the preliminary sample 3D image. The processing device 140B may segment the 3D region from the preliminary sample 3D image and designate the segmented 3D region as the second region. In some embodiments, the shape of the second region may be various, for example, the shape of the second region may include a cuboid, a cube, a cylinder, a cone, a pyramid, a prism, an irregular shape, or the like. Merely by way of example, the second region may be a cubic having a side length of 128 millimetres. In some embodiments, the size and/or the shape of the second region may be determined based on the organ type of the ROI. Merely by way of example, the processing device 140B may determine an ellipsoid with a predetermined size as the second region when the ROI is the head of the sample subject.

In 1080, the processing device 140B (e.g., the determination module 450) may determine the sample 3D image based on the second region. For example, the processing device 140B may designate the second region as the sample 3D image. Alternatively, the processing device 140B may resample the second region according to a predetermined image resolution (e.g., 128*128*128, 256*256*256, etc.). The processing device 140B may then designate the resampled second region as the second region.

Figure 11:
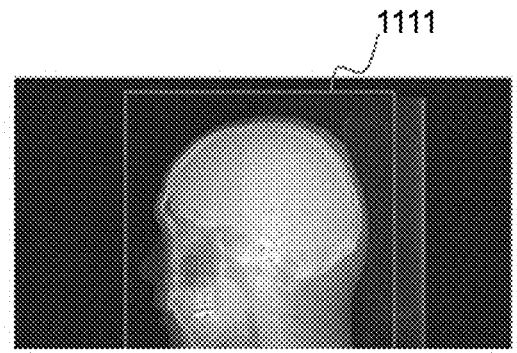
FIG. 11 is a schematic diagram illustrating an exemplary process for generating a 3D image according to some embodiments of the present disclosure.
Figure 11:
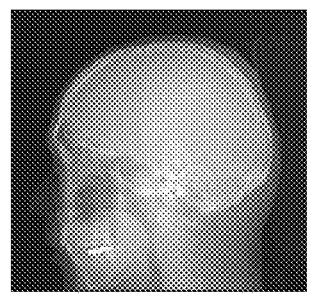
Figure 11:
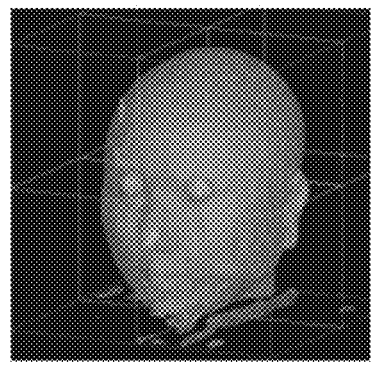

FIG. 11 is a schematic diagram illustrating an exemplary process for generating a target 3D image according to some embodiments of the present disclosure.

As shown in FIG. 11, a 2D image 1110 including the head and eyes of a patient is obtained. The 2D image 1110 is a lateral scout image of the patient captured by an imaging device. A bounding box 1111 enclosing the ROI of the patient was annotated on the 2D image 1110. A target 2D image 1120 corresponding to the ROI of the patient was generated by segmenting a portion enclosed by the bounding box 1111\from the 2D image 1110. The target 3D image 1130 was generated by processing the target 2D image 1120 using a 3D image generation model corresponding to a lateral posture.

Figure 12:
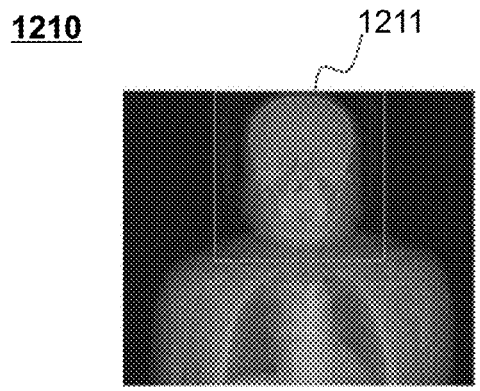
FIG. 12 is a schematic diagram illustrating another exemplary process for generating a 3D image according to some embodiments of the present disclosure.
Figure 12:
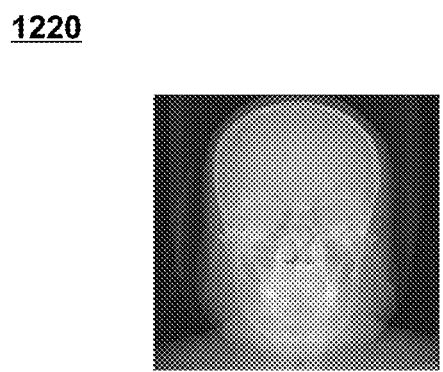
Figure 12:
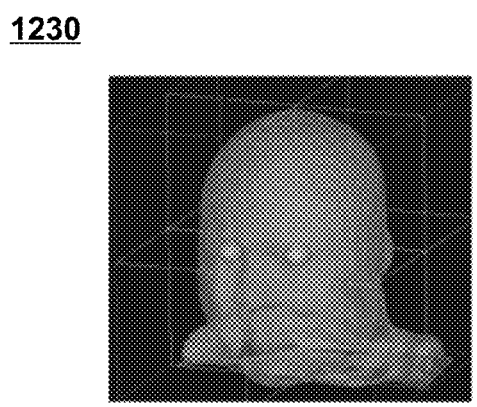

FIG. 12 is a schematic diagram illustrating another exemplary process for generating a 3D image according to some embodiments of the present disclosure.

As shown in FIG. 12, a 2D image 1210 of a patient is obtained. The 2D image 1210 is an AP scout image of the patient. The target 2D image 1220 may be generated by processing the 2D image 1210, for example, segmenting a portion corresponding to the ROI of the subject from the 2D image 1210, which was enclosed by a bounding box 1211. The target 3D image 1230 was generated using a 3D image generation model (e.g., the 3D image generation model 600) corresponding to the AP or PA scout image by inputting the target 2D image into the 3D image generation model.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for generating a three-dimensional (3D) image implemented on a computing device having at least one processor and at least one storage device, the method comprising:
   obtaining a target two-dimensional (2D) image of a subject;
   obtaining a 3D image generation model that includes a plurality of layers, wherein each layer of at least two layers of the plurality of layers includes a down-sampling block, a connection block, and an up-sampling block; and determining a target 3D image of the subject by processing the target 2D image using the 3D image generation model, wherein during the processing of the target 2D image, for each layer of the at least two layers, the down-sampling block is configured to generate a plurality of 2D feature maps by coding an input of the down-sampling block, the input of the down-sampling block including an output generated by a previous layer of the layer based on the target 2D image, the connection block is configured to generate, based on the plurality of 2D feature maps, at least one 3D feature map; and the up-sampling block is configured to generate at least one target 3D feature map associated with the target 3D image by processing the at least one 3D feature map, wherein the obtaining the 3D image generation model further includes:

determining a posture of the subject based on the target 2D image of the subject, the posture of the subject reflecting one or more of a position, a pose, or a shape of the subject in the target 2D image;

selecting, from a model library that includes a plurality of candidate 3D image generation models corresponding to a plurality of postures of the subject, a candidate 3D image generation model corresponding to the posture of the subject; and designating the selected candidate 3D image generation model as the 3D image generation model.

2. The method of claim 1, wherein the target 2D image includes a scout image of the subject.

3. The method of claim 2, wherein the scout image of the subject includes an anteroposterior scout image of the subject or a lateral scout image of the subject.

4. The method of claim 1, wherein to generate the at least one 3D feature map based on the plurality of 2D feature maps, the connection block is further configured to:

dividing the plurality of 2D feature maps into at least one group, each of the at least one group including at least two of the plurality of 2D feature maps;

for each of the at least one group, combining the at least two 2D feature maps in the group into a combined 3D feature map; and generating, based on the at least one combined 3D feature map of the at least one group, the at least one 3D feature map.

5. The method of claim 4, wherein the generating, based on the at least one combined 3D feature map of the at least one group, the at least one 3D feature map comprises:

for each of the at least one combined 3D feature map, generating a processed 3D feature map by performing a 3D convolution operation on the combined 3D feature map; and designating the at least one processed 3D feature map as the at least one 3D feature map.

6. The method of claim 1, wherein the 3D image generation model is generated according to a model training process including:

obtaining a preliminary model;

obtaining a plurality of training samples each of which includes a sample 2D image of a sample subject and a sample 3D image of the sample subject, wherein the sample 2D image is used as an input sample, and the sample 3D image is used as a ground truth for training; and generating the 3D image generation model by training the preliminary model using the plurality of training samples.

7. The method of claim 6, wherein the preliminary model is a preliminary generative adversarial network (GAN) model including a preliminary generator and a preliminary discriminator, and the generating the 3D image generation model includes:

generating a trained model by training the preliminary model using the plurality of training samples, the trained model including a trained generator trained from the preliminary generator and a trained discriminator trained from the preliminary discriminator; and designating the trained generator as the 3D image generation model.

8. The method of claim 6, wherein the obtaining the plurality of training samples includes:

for each of the plurality of training samples:

obtaining a preliminary sample 2D image of the sample subject of the training sample;

determining, based on the preliminary sample 2D image, a 2D coordinate of a point of interest (POI) relating to a region of interest (ROI) of the sample subject;

segmenting, from the preliminary sample 2D image, a first region corresponding to the ROI of the sample subject based on the 2D coordinate of the POI; and generating, based on the first region, the sample 2D image of the sample subject.

9. The method of claim 8, wherein the obtaining of the plurality of training samples further includes:

for each of the plurality of training samples:

obtaining a preliminary sample 3D image of the sample subject of the training sample;

determining, based on the 2D coordinate of the POI, a 3D coordinate of the POI;

segmenting, from the preliminary sample 3D image and based on the 3D coordinate of the POI, a second region corresponding to the ROI of the sample subject; and generating, based on the second region, the sample 3D image of the sample subject.

10. The method of claim 1, wherein the input of the up-sampling block in each layer of at least one layer of the at least two layers includes at least one target 3D feature map outputted by the up-sampling block of the next layer of the layer and the at least one 3D feature map outputted by the connection block of the layer.

11. The method of claim 1, wherein the 3D image generation model includes an input layer and an output layer, the at least two layers includes a first layer connected with the input layer and the output layer, and a second layer connected with the first layer, an input of the down-sampling of the first layer includes an output of the input layer, an input of the up-sampling block of the first layer includes at least one target 3D feature map outputted by the up-sampling block of the second layer and at least one 3D feature map outputted by the connection block of the first layer.

12. The method of claim 11, wherein an input of the down-sampling of the second layer includes the plurality of 2D feature maps generated by the down-sampling of the first layer.

13. The method of claim 11, wherein to generate the target 3D image of the subject:
the up-sampling block of the first layer is configured to transmit an output of the up-sampling block of the first layer to the output layer, and
the output layer is configured to generate the target 3D image by processing the output of the up-sampling block of the first layer.

14. The method of claim 1, wherein the up-sampling block of at least one layer of the plurality of layers includes a 3D residual unit configured to reduce vanishing gradients and/or increase the layers of the 3D image generation model.

15. A system for generating a 3D image, comprising:
at least one storage device including a set of instructions; and
at least one processor configured to communicate with the at least one storage device, wherein when executing the set of instructions, the at least one processor is configured to direct the system to perform operations including:
obtaining a target two-dimensional (2D) image of a subject;
obtaining a 3D image generation model that includes a plurality of layers, wherein each layer of at least two layers of the plurality of layers includes a down-sampling block, a connection block, and an up-sampling block; and
determining a target 3D image of the subject by processing the target 2D image using the 3D image generation model,
wherein during the processing of the target 2D image, for each layer of the at least two layers,
the down-sampling block is configured to generate a plurality of 2D feature maps by coding an input of the down-sampling block, the input of the down-sampling block including an output generated by a previous layer of the layer based on the target 2D image,
the connection block is configured to generate, based on the plurality of 2D feature maps, at least one 3D feature map; and
the up-sampling block is configured to generate at least one target 3D feature map associated with the target 3D image by processing the at least one 3D feature map, wherein the obtaining the 3D image generation model further includes:
determining a posture of the subject based on the target 2D image of the subject, the posture of the subject reflecting one or more of a position, a pose, or a shape of the subject in the target 2D image;
selecting, from a model library that includes a plurality of candidate 3D image generation models corresponding to a plurality of postures of the subject, a candidate 3D image generation model corresponding to the posture of the subject; and
designating the selected candidate 3D image generation model as the 3D image generation model.

16. The system of claim 15, wherein the 3D image generation model is generated according to a model training process including:
obtaining a preliminary model;
obtaining a plurality of training samples each of which includes a sample 2D image of a sample subject and a sample 3D image of the sample subject, wherein the sample 2D image is used as an input sample, and the sample 3D image is used as a ground truth for training; and
generating the 3D image generation model by training the preliminary model using the plurality of training samples.

17. The system of claim 16, wherein the preliminary model is a preliminary generative adversarial network (GAN) model including a preliminary generator and a preliminary discriminator, and
the generating the 3D image generation model includes:
generating a trained model by training the preliminary model using the plurality of training samples, the trained model including a trained generator trained from the preliminary generator and a trained discriminator trained from the preliminary discriminator; and
designating the trained generator as the 3D image generation model.

18. The system of claim 16, wherein the obtaining the plurality of training samples includes:
for each of the plurality of training samples:
obtaining a preliminary sample 2D image of the sample subject of the training sample;
determining, based on the preliminary sample 2D image, a 2D coordinate of a point of interest (POI) relating to a region of interest (ROI) of the sample subject;
segmenting, from the preliminary sample 2D image, a first region corresponding to the ROI of the sample subject based on the 2D coordinate of the POI; and
generating, based on the first region, the sample 2D image of the sample subject.

19. A non-transitory computer readable medium, comprising a set of instructions for generating a 3D image, wherein when executed by at least one processor, the set of instructions direct the at least one processor to effectuate a method, the method comprising:
obtaining a target two-dimensional (2D) image of a subject;
obtaining a 3D image generation model that includes a plurality of layers, wherein each layer of at least two layers of the plurality of layers includes a down-sampling block, a connection block, and an up-sampling block; and
determining a target 3D image of the subject by processing the target 2D image using the 3D image generation model,
wherein during the processing of the target 2D image, for each layer of the at least two layers,
the down-sampling block is configured to generate a plurality of 2D feature maps by coding an input of the down-sampling block, the input of the down-sampling block including an output generated by a previous layer of the layer based on the target 2D image,
the connection block is configured to generate, based on the plurality of 2D feature maps, at least one 3D feature map; and
the up-sampling block is configured to generate at least one target 3D feature map associated with the target 3D image by processing the at least one 3D feature map,
wherein the obtaining the 3D image generation model further includes:
determining a posture of the subject based on the target 2D image of the subject, the posture of the subject reflecting one or more of a position, a pose, or a shape of the subject in the target 2D image;
selecting, from a model library that includes a plurality of candidate 3D image generation models corresponding to a plurality of postures of the subject, a candidate 3D image generation model corresponding to the posture of the subject; and designating the selected candidate 3D image generation model as the 3D image generation model.

* * * * *